(12) United States Patent
Brown et al.

(10) Patent No.: US 7,841,296 B2
(45) Date of Patent: Nov. 30, 2010

(54) CONTROLLER FOR MONITORING AND CONTROLLING PULSATORS IN A MILKING SYSTEM

(75) Inventors: Stan A. Brown, Hanford, CA (US); Rafael Antonio Fematt, Hanford, CA (US)

(73) Assignee: Global Tech Systems, Inc. NM (US)

( * ) Notice: Subject to any disclaimer, the term of this patent is extended or adjusted under 35 U.S.C. 154(b) by 713 days.

(21) Appl. No.: 11/705,633

(22) Filed: Feb. 12, 2007

(65) Prior Publication Data

US 2007/0137580 A1    Jun. 21, 2007

Related U.S. Application Data

(63) Continuation-in-part of application No. 11/248,958, filed on Oct. 12, 2005, now Pat. No. 7,174,848, which is a continuation of application No. 10/359,824, filed on Feb. 7, 2003, now Pat. No. 6,990,924.

(51) Int. Cl.
*A01J 5/007* (2006.01)

(52) U.S. Cl. ............................ 119/14.08; 119/14.41

(58) Field of Classification Search ............. 119/14.01, 119/14.02, 14.05, 14.07, 14.08, 14.14, 14.27, 119/14.29, 14.38, 14.41
See application file for complete search history.

(56) References Cited

U.S. PATENT DOCUMENTS

| | | | |
|---|---|---|---|
| 3,547,080 A | 12/1970 | Russell | 119/14.14 |
| 3,783,837 A | 1/1974 | Olander | 119/14.08 |
| 4,005,680 A * | 2/1977 | Lole | 119/14.08 |
| 4,516,530 A | 5/1985 | Reisgies et al. | 119/14.08 |
| 4,572,104 A | 2/1986 | Rubino | 119/14.02 |
| 4,574,736 A * | 3/1986 | Tanaka et al. | 119/14.08 |
| 4,616,215 A | 10/1986 | Maddalena | 340/626 |
| 5,443,035 A | 8/1995 | Lind et al. | 119/14.02 |
| 5,584,262 A | 12/1996 | Schultz | 119/14.28 |
| 5,651,329 A | 7/1997 | van den Berg et al. | 119/14.28 |
| 5,860,388 A | 1/1999 | Tan et al. | 119/14.44 |
| 5,896,827 A | 4/1999 | Brown | 119/14.02 |
| 6,009,832 A | 1/2000 | Innings et al. | 119/14.02 |
| 6,073,579 A | 6/2000 | Innings et al. | 119/14.02 |
| 6,161,580 A | 12/2000 | Johannesson | 137/624.14 |

(Continued)

OTHER PUBLICATIONS

Machine Milking and Lactation, A.J.Bramley, F.H.Hdood, G.A. Mein and J.A.Bramley, Insight Books, Version USA, Chapter 7, pp. 235-284; Basic Mechanics and Testing of Milking System (the "Bramley Reference").

(Continued)

*Primary Examiner*—Kimberly S Smith
(74) *Attorney, Agent, or Firm*—Dennis F. Armijo

(57) ABSTRACT

A controller for monitoring and controlling an operating pulsator in a milking system is shown. The controller receives a start signal generated when a milking apparatus is attached to a cow. A first sensor is operatively connected to a designated pulsator for receiving a pulsating vacuum and for producing a first signal representing the pulsating vacuum level. The controller includes a processor having a comparator for comparing the first signal to a stored reference of predetermined vacuum ranges and for generating a control signal when the designed pulsator pulsating vacuum level is outside of a predetermined vacuum range. A control circuit signals that the designated pulsator pulsating vacuum level is outside of the predetermined vacuum range.

19 Claims, 13 Drawing Sheets

U.S. PATENT DOCUMENTS

| | | | |
|---|---|---|---|
| 6,257,169 B1 | 7/2001 | Oosterling | 119/14.02 |
| 6,508,109 B2 | 1/2003 | van den Berg | 73/64.56 |
| 6,553,934 B2 | 4/2003 | Gentner et al. | 119/14.02 |
| 6,604,053 B2 | 8/2003 | Fematt | 702/45 |
| 2002/0104484 A1 | 8/2002 | Gentner et al. | |

OTHER PUBLICATIONS

The Automatic Milking Center for Progressive Dairies, Beco Dairy Automation, inc., Product Brochure, Two (2) Pages; 0/25/2006.

\* cited by examiner

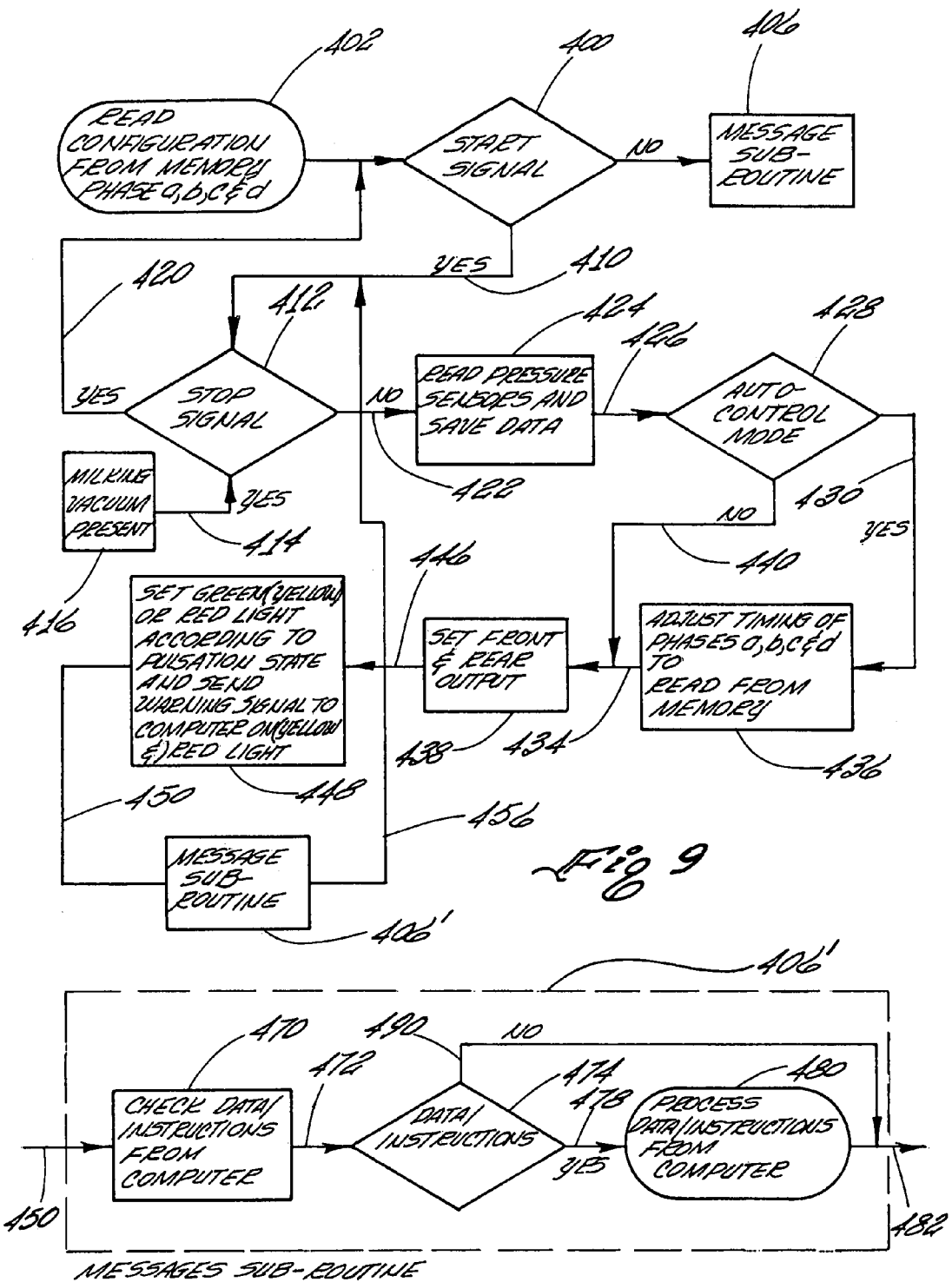

Alarm Configurations

Setting Rates and Ratios

| | |
|---|---|
| PPM >> | 60 |
| F. Ratio >> | 60% |
| R.Ratio >> | 40% |

Setting System Variables

| | | |
|---|---|---|
| "A" time >> | 100 | < Note : every system is different |
| "C" time >> | 130 | < Note : every system is different |

Setting Alarm Parameters

| | |
|---|---|
| Yellow % >> | 85% |
| Red % >> | 70% |

| | Ideal ms | Yellow Warning min | Yellow Warning max | Red Warning min | Red Warning max |
|---|---|---|---|---|---|
| A + B | 600 | | | | |
| A phase | 100 | 85 | 118 | 70 | 143 |
| B phase | 500 | 425 | 588 | 350 | 714 |
| C + D | 400 | | | | |
| C phase | 130 | 111 | 153 | 91 | 186 |
| D phase | 270 | 230 | 318 | 189 | 386 |

Fig 11

CONTROLLER FOR MONITORING AND CONTROLLING PULSATORS IN A MILKING SYSTEM

CROSS-REFERENCES TO RELATED APPLICATIONS

This Application is a Continuation-in Part of U.S. patent application Ser. No. 11/248,958 filed Oct. 12, 2005 now U.S. Pat. No. 7,174,848 which is a Continuation of U.S. patent application Ser. No. 10/359,834 filed Feb. 7, 2003 and which has issued as U.S. Pat. No. 6,990,924.

STATEMENT REGARDING FEDERALLY SPONSORED RESEARCH OR DEVELOPMENT

Not Applicable

REFERENCE TO A "MICROFICHE APPENDIX" (SEE 37 CFR 1.96)

Not Applicable

BACKGROUND OF THE INVENTION

1. Field of the Invention

The present invention relates to apparatus, method and system of supervising, monitoring and controlling all of the pulsators of a milking machine having a teatcup with a teatcup liner and a pulsation chamber comprising applying a milking vacuum to the interior of the teatcup liner and a pulsating vacuum to the pulsation chamber so that the teatcup liner cyclically moves between a substantially open position and a substantially closed position under control of pulsation vacuum pulses from a pulsator and more particularity relates to a pulsator controller for a milking machine comprising a teatcup with a teatcup liner and a pulsation chamber, a vacuum source for generating a milking vacuum in the interior of the teatcup liner and a pulsator provided to alternately connect the pulsation chamber to the atmosphere and to the vacuum source for generating a pulsating vacuum in the pulsation chamber to produce a pulsating movement of the teat cup liner between a substantially open position and a substantially closed position wherein the controller signals that a designed pulsator pulsating vacuum level is at a vacuum level outside of the predetermined vacuum range based on a stored reference signal received by a processor in a controller representing a predetermined vacuum range of pulsating vacuum levels programmed as acceptable for milking system pulsators. The processor may include a monitoring section to monitor the designated pulsator vacuum pulsation level and a pulsator section to control, actuate or deactuate the vacuum pulsator to a milk claw.

2. Description of the Prior Art

Milking systems having a vacuum for performing milking of dairy animals, such as cows, are well known in the art. Certain of the milking systems have the milking process for dairy animals, such as cows, automated to facilitate faster and consistent milking of dairy animals.

A reference entitled MACHINE MILKING AND LACTATION by A. J. Bramley, F. H. Dood, G. A. Mein and J. A. Bramley, published by Insight books, Vernon, USA, describes the history, background and state of the art in milking systems and in Chapter 7 entitled *Basic Mechanics and Testing of Milking Systems* by G. A. Mein appearing at Pages 235 through 284, discloses and describes typical milking machine installations (the "Bramley et al. Reference"). U.S. Pat. No. 5,896,827 discloses a milking system having a substantially stable continuous vacuum level through a milk claw and milk hose wherein the milking system includes a milking apparatus for connection with an animal's teats to apply a controlled vacuum thereto to remove milk therefrom at various milk flow rates.

As milking systems become automated, milking system include monitoring apparatus for monitoring other functions in the milking system and for generating a signal if certain unacceptable operating condition occur. Examples of such monitoring apparatus are disclosed in the following United States Patents.

U.S. Pat. No. 4,616,215 discloses a vacuum monitoring apparatus which includes a control circuit having a transducer for sensing the vacuum levels in a milking system and for generating output signals. The control circuit includes a comparator for controlling indicator devices and an alarm circuit in response to a set point when the vacuum levels are at high, low and normal settings. The control circuit includes a time delay circuit that disables the alarm circuit for a predetermined time delay to provide for measurement of the vacuum recovery rate for the system.

U.S. Pat. No. 4,605,040 discloses a partial-vacuum regulating valve that automatically regulates an operating partial vacuum in milking systems. The partial-vacuum regulating valve consists of a main valve and an auxiliary valve. The auxiliary valve body is adjusted in accordance with the partial vacuum prevailing in the milking system and affects the amount of air that is drawn out of the main valve control chamber, which communicates with the atmosphere through a calibrated bore, through a certain channel. The partial-vacuum is adjusted in the control chamber in accordance with the amount of air drawn out and that adjustment determines the position of the auxiliary valve. The position of the auxiliary valve determines the amount of air flowing into a certain line through the air-inlet opening, which in, turn, affects the partial pressure in the line. The main-line control chamber has an additional calibrated air inlet that is closed off with a cap. When the cap is removed, atmospheric air also flows through the additional inlet into the main valve control chamber and reduces the partial vacuum therein. The associated descent of the valve body reduces the air admitted onto the line and hence leads to partial pressure in the milking system that is lower than the partial pressure established for the milking process by means of a screw and spring.

U.S. Pat. No. 4,572,104 discloses a method of milking for a double action milking system. Milking is initiated at one ratio of milk period and then increased to a selected higher ratio. Milking is then done at the selected higher ratio for a selected segment of time or until the milk flow rate falls below a predetermined value, after which the ratio is decreased so that milking is completed at a lower ratio. A valve is used to selectively alternatively connect a line going to the teat cups to vacuum or to atmospheric pressure.

U.S. Pat. No. 4,516,530 discloses an automated milking system in which the milking vacuum applied from a vacuum line through a milk flow valve and the milk hose to a teat cup cluster is initially shut off after automatic detacher controls provide a signal indicating the end of milking. A milk sweep controls a back flush system which passes a flushing fluid through the milk flow valve into the milk house and teat cup cluster to flush out these components.

U.S. Pat. No. 3,783,837 discloses a milking machine having a duct under partial vacuum that leads milk from the teat cup cluster to form a milk flow having a milking flow rate. The duct has a regulating valve which is used to vary the milking vacuum. A device for sensing changes in the rate of milk flow through the duct is connected to control means for operating the regulating valve to an idling value in response to a decrease in the milk flow rate and an increase in the milking vacuum from an idling value to a working value in response to an increase in the rate of milk flow.

One example of automated dairy barn or milking parlor is a herringbone milking stall parlor wherein the dairy animal is directed into a milking stall. Once the dairy animal is in the stall a milking apparatus, comprising a milking claw and inflations, have the inflations thereof attached to the teats of a dairy animal to perform the milking process which commence when the milking vacuum is enabled or turned on. The inflations are each formed of a separate teat cup and teat cup liner assembly that are attached to the teats of the dairy animal. Typically the inflations have four teat cup and teat cup liner assemblies, one for each teat of a dairy animal, e.g. a cow.

Each teat cup has a shell and a teat cup liner is provided in the shell to form a pulsation chamber between the teat cup liner and the shell. During milking, the interior of the teat cup liner is subjected to a varying milking vacuum that typically varies over a range of about 10 inches Hg to about 12 inches Hg and then to atmospheric pressure. The pulsation chamber is subjected to a cyclically pulsating vacuum normally varying between atmospheric pressure, when the teat cup liner is collapsed or closed, and a maximum vacuum level of about 12 inches Hg when the teat cup liner is fully open. The maximum pulsating vacuum level is normally about 12 inches Hg under atmospheric pressure, i.e. equal to the milking vacuum level. This means that the pressure difference across the wall of the teat cup liner is essentially equal to zero when the teat cup liner is open.

In the state-of-the-art milking systems, the pulsating vacuum is controlled by a pulsator as described above. The pulsator has a pulsation cycle which is divided into four phases; (i) an opening phase (a) during which the pulsating vacuum increases from atmospheric pressure to the milking vacuum level and the teat cup liner moves from a closed position to an open position, (ii) an open phase (b) during which the pulsating vacuum has reached its maximum level, which is substantially equal to the milking vacuum level, the teat cup liner is in an open position allowing milk to flow from a teat, (iii) a closing phase (c) during which the pulsating vacuum decreases from about the milking vacuum level to the atmospheric pressure and the teat cup liner moves from the open position to the closed position, and (iv) a closed phase (d) during which the pulsating vacuum is equal to the atmospheric pressure and the teat cup liner is in a closed position stopping milk flow from a teat. The above action of the pulsator is referred to herein generally as the "pulsation process".

Each milking apparatus has a separate pulsator for controlling each teat cup shell and a teat cup liner by applying a vacuum to each pulsation chamber between the teat cup liner and the shell. The pulsator and the pulsation system is a vital part of a milking facility. There is usually one pulsator designated for each milking apparatus being used to milk a dairy animal, e.g. a cow. If a milking parlor or milking barn has "N" milking apparatus all capable of milking cows at the same time, the milking parlor or milking barn would typically have "N" separate pulsators.

As discussed above, monitoring of the pulsation process, during which the teat cup liner movement occurs, is very important to the health and milk production of a cow. Improper or defective operation of a pulsator or a malfunction of a pulsator, if allowed to go unnoticed for a considerable period of time, can cause damage to the cow. Such damage results because of trauma experienced by the teat of a dairy animal arising from improper teat cup liner movement and such damage could include causing mastitis to the dairy animal.

Mastitis is an infection of animal body tissue within the mammary system of an animal. Mastitis may be caused by a number of other conditions including irritation to the teats, as is well known to persons skilled in the art. When mastitis occurs, it is an infection that the animal, e.g. cow's, body must counteract. Thus the animal's body energy is to be used to fight infection rather than produce milk.

If the infection is severe enough, significant and sometimes permanent damage can be caused to the cow's normal milk producing organisms. All mastitis cause some level of permanent and lifetime irrefutable damage to the animal's milk producing (mammary) system. The level of severity is in direct relation to the severity and length of time that an infection exists. As such, a severe or lengthy period of infection may limit the animal's production capabilities and affect the animal's milk producing life.

A milking machine, milking apparatus or milking system generally causes mastitis in two ways.

First, mastitis is caused by application of damaging vacuum levels to the cows' teats which create a severe irritation. Since it is difficult to isolate with any degree of certainty at what level of vacuum such irritation occurs, the conservative approach is the least level of vacuum, the better. Each animal, such as a cow, reacts differently to vacuums being applied to teats and each animal tolerates various levels of vacuum differently.

Second, mastitis is created by a milking apparatus, causing foreign bacteria to be introduced into the animal, e.g. cow. As milk is being drawn from the cow, the teats are exposed to a vacuum which is less than atmospheric pressure. However, the outside of the udder is under atmospheric pressure and, in essence, atmospheric pressure is what is "squeezing" the milk out of the animal's teats in response to a periodic pulsating or controlled vacuum from a pulsator.

If a pulsator is defective, is not operating properly or if a malfunction occurs affecting the pulsation process, it is desirable to detect and correct such a condition as soon as possible. Doing so will most likely limit or prevent damage or injury to a dairy animal and help maintain the dairy animal in a healthy condition for giving milk. A dairy animal in good health produces a higher volume of milk during each milking cycle.

One known method for insuring proper operation of the pulsators and pulsation process is to test the milking system on a monthly basis using a recorder for measuring vacuum levels of each of the pulsators and the measuring the pulsation phases of the pulsation cycles. Based on the test results, appropriate repairs can be made to the pulsator, vacuum lines and milking apparatus as required to remedy the identified deficiency or malfunction.

Between tests, an improperly operating pulsator or other malfunction or deficiency in the milking system related to the pulsating process can go unnoticed for an extended period of time, sometimes as long a month, when the next test is scheduled to be conducted.

In the prior art monthly pulsator monitoring testing program, each pulsator is tested on an individual basis and a determination is then made whether the pulsator operates within an acceptable standard. If the pulsator's operation is deficient or if the pulsator malfunctions, the pulsator is repaired or replaced, as necessary.

Other known apparatus for monitoring and controlling pulsators disclosed in certain United States Patents are discussed below.

U.S. Pat. Nos. 6,009,832 and 6,073,579 disclose a milking machine having a teat cup with a teat cup liner and a pulsation chamber. The abrupt movement of the teat cup liner when the teat cup liner moves to an open or closed position is sensed. If a sensed movement does not fulfill a predetermined condition, a signaling means signals the malfunction.

U.S. Pat. No. 5,443,035 discloses a milking machine pulsation control that includes a micro controller which generates a pulse width modulated drive signal to control current to pulsator valves, with a high current for pull-in and a lower current for holding. A watchdog circuit resets the computer in the event of latch-up as a result of circuit transients.

United States Patent Application Publication No. 2002/0104484 published on Aug. 8, 2002 which matured into U.S. Pat. No. 6,553,934 (Gentner et al) discloses a method and apparatus for monitoring the operation of a pulsator by recording calibration data from that specific pulsator during a calibration mode made on that specific pulsator during normal operations and using the so recorded pulsator specific calibration data for comparison using a processor with data developed from that specific pulsator during milking operation and the processor provides a signal to an output, which signal indicates if the pulsator is operating.

None of the known prior art anticipates, discloses, suggests or teaches or a controller for monitoring and controlling pulsators in a milking system wherein the referenced data stored in a computer system is a programmed standard for an acceptable predetermined vacuum range of pulsating vacuum levels for a pulsator is predetermined for the milking system. The programmed standard for an acceptable predetermined vacuum range for a pulsator predetermined for the milking system is entered into and stored in the computer system as a reference standard for monitoring operation of all of the "N" pulsators in the milking system. The controller includes sensors and uses a start signal to verify that a milking apparatus is attached to a dairy animal at the commencement of a milking cycle.

In the method and apparatus for monitoring the operation of a pulsator disclosed U.S. Pat. No. 6,553,934, each separate pulsator must be calibrated individually, recorded separately in a separate recording step and that calibration data can only be used with that specific pulsator during monitoring. If milking parlor or milking barn has "N" milking systems, then "N" pulsators must be separately calibrated, that calibration data must be stored as recorded data for each pulsator, and each compare cycle is required to address each specific calibration data for each specific pulsator.

In addition, the method and apparatus for monitoring the operation of a pulsator disclosed in U.S. Pat. No. 6,553,934 does not anticipate, disclose, suggest or teach verifying that the milking apparatus is attached to a dairy animal during monitoring of the specific pulsator of a specific milking apparatus to avoid generation of error signals. None of the known prior art anticipates, discloses, suggests or teaches or a controller for monitoring and controlling pulsators in a milking system wherein a processor within the pulsator controller receives a start signal generated when a milking apparatus of a milking system is attached to a cow to be milked and for receiving a stop signal generated when a cow being milked has reached the end of a milking cycle or a milking apparatus is disabled. In the present invention, the start signal concurrently enables the processor to receive a first signal representing the pulsating vacuum level from the designated pulsator and for enabling operation of the designated pulsator to supply vacuum pulses to a milking apparatus. The processor is responsive to the stop signal to concurrently disable receiving the first signal representing the pulsating vacuum level from the designated pulsator and for deactuating operation of the designated pulsator from supplying vacuum pulses to a milking apparatus. The above functions may be used for activating/deactivating the monitoring of the pulsator. The monitoring function can also deactivate operation of the pulsator. Deactivating of the pulsation when a cow is not being milked has the additional advantage of saving wear and tear on the pulsator.

In cases where a dairy installation already has a pulsator controller, the monitoring function alone can be used. However, in such situations, when the monitoring is stopped in response to a "stop signal", the pulsator may keep on working.

BRIEF SUMMARY OF THE INVENTION

The present invention discloses and teaches a new, novel and unique controller for monitoring and controlling operating pulsators in a milking system. The controller for monitoring and controlling operating pulsators in a milking system includes a first input configured to be operatively connected to a designated pulsator for receiving the pulsating vacuum. A first sensor receives the pulsating vacuum and produces a first signal representing the pulsating vacuum level received from the designated pulsator selected from an "N" number of pulsators operating in a milking system. The controller further includes a processor operatively connected to the first sensor for receiving the first signal representing a pulsating vacuum level from the designated pulsator being monitored. The processor includes a comparator for comparing the first signal representing a pulsating vacuum level from the designated pulsator being monitored to a stored reference signal applied to the processor from a computer and the stored reference signal represents a predetermined vacuum range of pulsating vacuum levels programmed as acceptable for all milking system pulsators. The processor generates at least one control signal when the designed pulsator pulsating vacuum level is at a vacuum level outside of the predetermined vacuum range. A control circuit is responsive to the at least one control signal for signaling that the designed pulsator pulsating vacuum level is outside of the range of pulsating vacuum levels programmed as acceptable for the milking system pulsators.

Therefore, it is an advantage of the present invention to provide apparatus, a system and method for monitoring and controlling operating pulsators in a milking system.

Another advantage of the present invention is that a microprocessor in the pulsator controller generates at least one control signal when the monitored pulsator pulsating vacuum level is at a vacuum level outside of a programmed predetermined vacuum range.

Another advantage of the present invention is that the pulsator controller has a control circuit for signaling that a monitored pulsator pulsating vacuum level is outside of the range of pulsating vacuum levels programmed as acceptable for the milking system pulsators.

Another advantage of the present invention is that the pulsator controller control circuit is capable of disabling operation of the monitored pulsator having a pulsating vacuum level which is outside of the range of pulsating vacuum levels programmed as acceptable for the milking system pulsators.

Another advantage of the present invention is that the is that the pulsator controller can generate at least one of an acceptable control signal when the designated pulsator pulsating vacuum level is at a vacuum level within the predetermined vacuum range programmed as acceptable for the milking system pulsators and an unacceptable control signal when the designed pulsator pulsating vacuum level is at a vacuum level outside of the predetermined vacuum range.

Another advantage of the present invention is that the pulsator controller control circuit is responsive to an unacceptable control signal and to an acceptable control signal to enable a red illumination device and a green illumination device, respectively.

Another advantage of the present invention is that the pulsator controller can be used in a system for monitoring and controlling an operating pulsator in a milking system.

Another advantage of the present invention is that the pulsator controller can be used in a method for monitoring and controlling an operating pulsator in a milking system.

Another advantage of the present invention is that the pulsator controller verifies that the milking apparatus is attached to a dairy animal during monitoring and that the milking vacuum is on to avoid generation of error signals.

Another advantage of the present invention is one of the known causes of mastitis can be significantly reduced by using the pulsator controller of the present invention which leads to greater milk production and improved health of a dairy animal or cow.

Another advantage of the present invention is that the pulsator controller includes a processor which receives a start signal which is generated when a milking apparatus of a milking system is attached to a cow to be milked and a stop signal which is generated when a cow being milked has reached the end of a milking cycle or a milking apparatus is disabled or deactuated.

Another advantage of the present invention is that the pulsator controller includes a processor which is responsive to a start signal to concurrently enable the processor to receive and monitor a first signal representing the pulsating vacuum level from the designated pulsator and to actuate the designated pulsator to supply vacuum pulses to a milking apparatus.

Another advantage of the present invention is that the pulsator controller includes a processor that is responsive to the stop signal to concurrently disable the processor from receiving and monitoring the first signal representing the pulsating vacuum level from the designated pulsator and for deactuate operation of the designated pulsator from supplying vacuum pulses to a milking apparatus.

Another advantage of the present invention is that the pulsator controller includes a processor that is responsive to a start signal to concurrently enable a monitoring section of the processor to receive and monitor a first signal representing the pulsating vacuum level from the designated pulsator and a pulsation section of the processor to actuate the pulsation to supply vacuum pulses to the designated pulsator of a milking apparatus.

Another advantage of the present invention is that the pulsator controller includes a processor that is responsive to a stop signal to concurrently disable a monitoring section of the processor from receiving and monitoring the first signal representing the pulsating vacuum level from the designated pulsator and a pulsation section of the processor for deactuating operation of the pulsator from supplying vacuum pulses to the designated pulsator of a milking apparatus.

BRIEF DESCRIPTION OF THE DRAWING

The present invention will become more fully understood from the following detailed description of a preferred but non-limiting embodiment thereof, described in connection with the accompanying drawings, wherein:

FIG. 9 is a flow chart showing the steps of method of using the pulsator controller for monitoring and controlling a pulsator;

FIG. 10 is message sub-routine flow chart showing the steps of method of using the pulsator controller for monitoring and controlling a pulsator;

FIG. 11 is a pictorial representation of monitor in a computer system used for monitoring the pulsators in a milking system showing an alarm configuration for a designated pulsator;

DETAILED DESCRIPTION OF THE INVENTION

Before proceeding with the description of the preferred embodiment, the following background will be helpful in understanding this invention.

Description of Milking System

When a cow enters a milking barn or milking parlor, such as a herring bone style milking parlor, and the milking machine or milking apparatus is connected to the animal's body and a milking vacuum is applied to the apparatus, the body starts to react in preparation for "letting down" of the diary animal's, e.g. cow's, milk. A natural process takes place wherein the animal produces within the animal's blood stream a chemical called "oxitosin". This chemical works its way down into the udder causing the ovili cells to contract. In essence, contraction of the ovili cells causes a squeezing effect to help push out, expel or withdraw the animal's milk. The period of time the animal produces this oxitosin is limited, and recent research suggests somewhere between 4 minutes and 6 minutes on average.

Once an animal stops producing oxitosin, it becomes difficult, if not impossible, to withdraw or remove any remaining milk from the animal. When milk is left in the udder of the animal, nature "tells" the animal's body that it does not need to produce as much milk. Therefore, when this happens the animal's body will level off milk production and eventually decreases production during that lactation.

When a cow begins lactation, the cow increases its production of milk each day as a natural response to "feed" the animal's growing baby calf. At some time during that lactation, the cow will naturally level off and then begin a decrease in production. This is nature's way of "weaning" off the calf.

In the state-of-the art milking systems, monitoring of the pulsation process, during which the teat cup liner movement occurs, and monitoring of all of the pulsators, which control the teat cup liner movement, have become very important because an undetected defective or malfunctioning pulsator, can affect the health and milk production of a cow.

With this in mind, one can conclude it is important to that all pulsators are operating properly, otherwise the dairy animal could suffer damages to its teats which likely could result in the dairy animal producing less milk. For these reason, properly operating pulsators are important to the dairyman and the teachings of this invention will directly maintain the health of dairy animals and will enhance withdrawing of milk during the period of time the animal is "naturally" willing to give milk.

The pulsator controller for a milking system using the teachings of this invention represents an important advancement in the state-of-the-art dairies.

Figure 1:
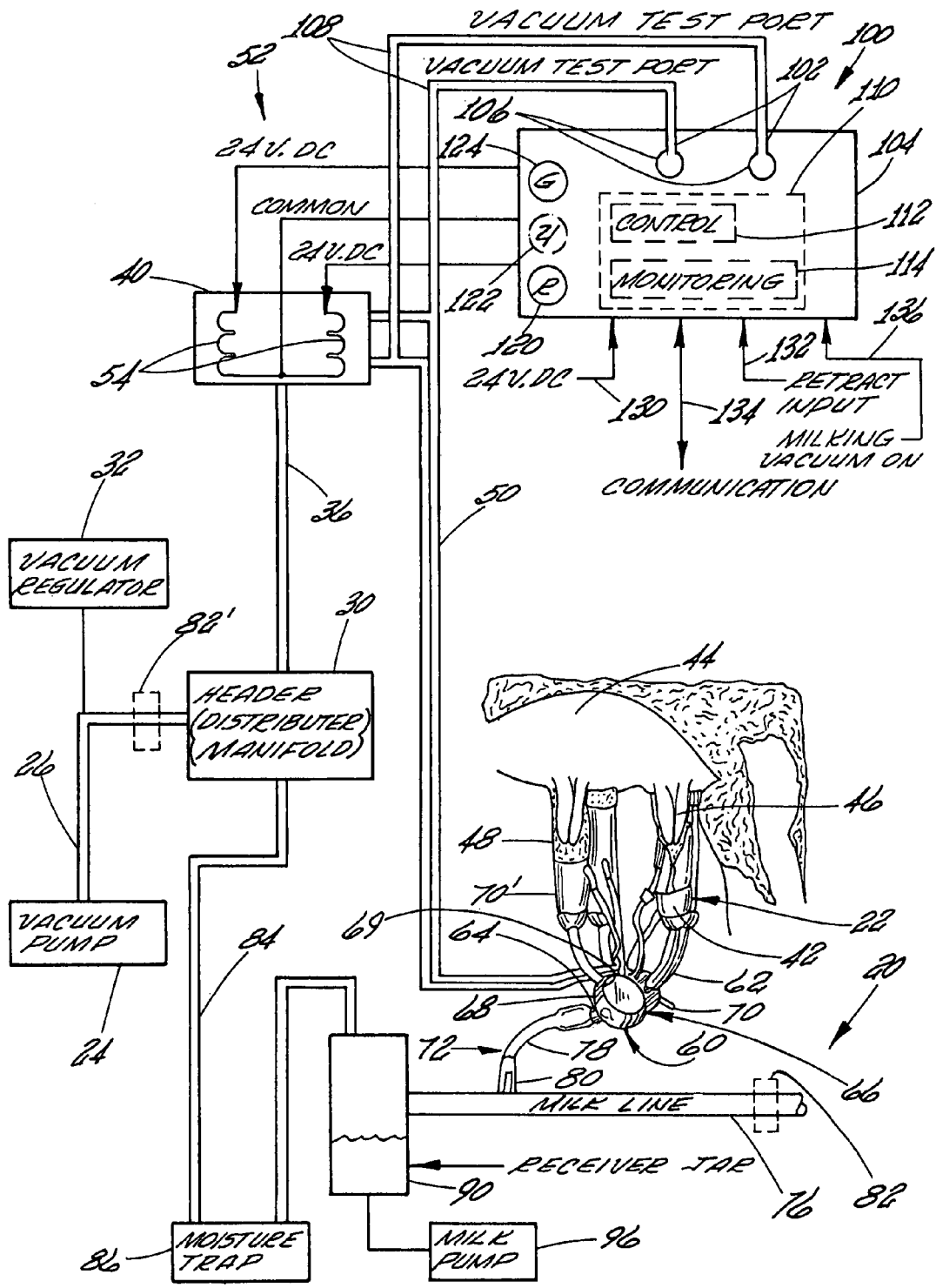
FIG. 1 is a pictorial representation of a milking system illustrating the milking apparatus, milk claw, milk hose, control device, milk line and associated components of the milking system.

The pictorial drawing of FIG. 1 illustrates a milking system showing generally as 20 which is installed in a milk parlor operation having a plurality of vacuum-operated milking machines shown generally as 22 in individual stalls.

In FIG. 1, a source of vacuum is provided to the milking system by vacuum pump 24 through a vacuum conduit 26 to a vacuum manifold header 30. A vacuum regulator 32 is operatively connected to the vacuum conduit 26 to control the maximum vacuum that would be applied to the milking system. Typically, the vacuum level in a milking system is in the order of 12 inches of Hg (12" Hg).

The vacuum manifold header 30 is operatively coupled by a pulsation line 36 to a pulsator 40.

The pulsation line 36 is generally a plastic or steel line that carries vacuum, equal to the desired preset vacuum level, to the pulsator 40. Pulsation line 36 must be adequately sized to carry air away from the pulsator without allowing a drop in vacuum (lower than the milking vacuum level).

The pulsator 40 is a device that intermittently applies pulsating vacuum pulse through flexible conduit 50 from within the shell (outside the liner) of the inflation 42 and creates a vacuum to "pull" to "open" the inflation 42 away from or releasing the teat of the cow making the teat open so that the vacuum from the milk claw draws milk down thorough the teat. This is referred to as a "milk period". Alternatively, atmospheric pressure is applied by the pulsation 40 to the liner to "push" or "close" the inflation 42 against the teat of the cow closing off the teat. This is referred to as a "rest period". The pulsator 40 periodically draws air out of the inflation 42 by application of pulsating vacuum pulses at a controlled vacuum level to create the cycle of opening and closing of the teat cup liner. This creates a situation of milking (teat under vacuum) and rest (teat not under vacuum).

As illustrated in FIG. 1, the vacuum pump 24 removes air from the milking system to create less than atmospheric pressure within the milking system. The vacuum manifold header 30 is essentially a distribution manifold that allows both the milk line 76 and pulsation line 36 to have equal access to the vacuum source, which in this embodiment is a vacuum pump 24 and vacuum regulator 32.

The vacuum regulator 32 is a vacuum level controller which is a device that maintains a predetermined or preset vacuum level within the milking system 20. A typical vacuum pump 24 has capacity to draw vacuum levels lower than the levels desired in the basic milking system 20. The vacuum regulator 32 includes an air inlet to vary or balance the capacity of the vacuum pump 24 or to change the air introduced into the milking process during normal operation. At times when the milking system 20 is intermitting air equal to the vacuum pump 24, the vacuum controller or vacuum regulator 32 will be off (no air inlet). When the milking system is intermitting air less than the capacity of the vacuum pump 24 capacity, the vacuum regulator 32 will open and "make-up" the difference to maintain a constant and predetermined level of vacuum into the milking system 20 equal to the capacity of the vacuum pump 24.

Referring back to FIG. 1, the milking apparatus shown generally as 22 has the inflations 42 which define the teat-engaging portion of a teat cup cluster. The milking apparatus 22 is adapted to have the inflations 42 operatively connected or operatively attached with an animal's udder, such as for example a cow's udder 44, having teats 46 to apply a controlled vacuum to the teats 46 to remove milk therefrom. The inflations 42 include a shell and liner 48 which have an "open" and "closed" position depending upon the vacuum pressure applied thereto as described hereinbefore. The vacuum pulsator 40 is operatively connected by a flexible vacuum lines 50 to control the shells and liners 48.

The shells and liners 48, comprises two components. The first component is a liner which is a soft rubber tube that goes around the cow's teat 46 to seal it off from atmospheric pressure to allow the vacuum to draw milk from the cow's udder 44. The other component is a shell which is a rigid device that houses the liner and can seal the outside of the liner from atmospheric pressure. The shells and liners 48 cooperate to selectively or controllably apply vacuum to the cow's udder 44 and teats 46 to withdraw the milk.

A milk claw 60, is operatively connected to the inflations 42 by means of flexible tubing 62, to receive milk from the inflations 42 at various milk flow rates. The milk claw 60 receives and passes the milk under a stabilized continuous vacuum in a vacuum channel at a selected vacuum level and, most importantly, at peak milk flow rates. The milk claw 60 includes an outlet 64 having side walls and a predetermined cross-sectional area, which in the preferred embodiment, is selected to be in the range of: (i) a minimum cross-sectional area for maintaining at all milk flow rates a substantially uniform laminar flow of milk there through and for concurrently providing a stabilized continuous vacuum in a vacuum channel between the laminar flow of milk and the interior walls of the outlet 64; and (ii) a maximum cross-sectional area equal to about 1.5 times the minimum cross-sectional area of the outlet 64. Certain of the known prior art systems have a milk claw having an outlet having a diameter of ⅝ inch. The teachings of this invention can be used in all of the known prior art milking system having using any of the known milk claws.

In the preferred embodiment, the milk claw 60 has four (4) inflations 42 since a cow has (4) four teats. The inflations 42, under controlled vacuum pressure from the pulsator 40, extracts milk from the cow's udder 44 as described hereinbefore.

The milk claw 60 functions as a manifold device (claw) that brings the milk from four inlets into single outlet. The milk claw 60 further may optionally include a control orifice 70, which is in the form of a calibrated orifice, for controllably admitting atmospheric pressure to the milk claw 60. Control orifice to functions for controlling the vacuum level within the milk claw outlet 64. Also, the milk claw 60 has a housing 66 that has a central chamber 68 defined by sidewalls 69.

In the alternative, the inflations 42 may optionally include a control orifice shown as 70'. Also, both the milk claw 60 and the inflation 42 may each have a control orifice 70 and 70' respectively, as the case may be.

It is desirable to intermit air to the vacuum system at this point in the milk claw 60 as the cow produces fluid milk, it would otherwise be difficult to transport the milk away from the cow without approaching flooding. Therefore, the milk claw 60 may have an air bleed port or control orifice 70 formed therein.

The milk claw outlet 64 is operatively connected by a milk transport conduit, shown generally as 72. The milk transport conduit 72 includes a semi-flexible hose 78 operatively connected to a nipple inlet 80 of a milk line 76.

The term "milk transport conduit" is intended to cover any flexible conduit material such as a semi-flexible hose used in a milking system. Preferably, the milk transport conduit has a cross-sectional area substantially equal to the cross-sectional area of the outlet 64.

The term "milk transport conduit" is intended to also include any other intermediate in line components, devices, control apparatus or the like (such as, for example, a milk flow measuring device 82 for terminating or shutting off the vacuum at the end of a milking cycle shown in FIG. 1) vacuum sensing devices and the like.

In the embodiment illustrated in FIG. 1, the milk transport conduit is in the form of a semi-flexible clear plastic hose 78 which is operatively connected to an inlet nipple 80 of the milk line 76. In the preferred embodiment, the semi-flexible hose 78 is a plastic or rubber hose connecting the milking claw outlet 64 to the inlet nipple 80 as described above.

The milk line 76, commonly referred to as a milk transfer line, is in the form of a stainless steel line with adequate capacity to carry vacuum to the cow from the vacuum source 24. The vacuum manifold header 30 applies vacuum via a conduit 84 and a moisture trap 86 to a receiving vessel such as a receiving jar 90 which is in the form of an enclosed vessel functioning as a vacuum chamber. The receiving jar 90 is operatively connected to a milk pump 96 to remove the milk collected in the receiving jar 90.

The milk line 76, under a vacuum which is applied thereto through the receiving jar 90, transports the milk away from the cow to the receiving jar 90 where it is accumulated and pumped away by milk pump 96.

It is important for the milk transfer line 76 to have enough capacity to carry milk away from all individual milking apparatus 22 while still leaving adequate capacity to form a vacuum channel for unrestricted, stable, continuous closed vacuum system to the cow's udder 44.

The milk transfer line 76 and receiver jar 90 must be sized to have enough capacity such that the milk flow will not fill the line, e.g. flood the line, which would block the vacuum channel and flow of vacuum to the milking apparatus 22 operatively connected to the cow's udder 44.

In addition, the milking system can have control valves, such as 82 and 82' which are used to enable or to turn on the milking vacuum on or to disable the milking vacuum or to turn off the milking vacuum. The control valves 82 and 82' may include or cooperate with a sensor for detecting whether the milking vacuum is on or off which is represented by lead line 136 and the sensor can generate a vacuum control signal verifying that the milking vacuum is present. The vacuum control signal can be used as a verification signal for the monitoring and control functions, as discussed hereinafter; or a "start signal" or a "stop signal" can be produced using a detacher as discussed hereinafter.

Description of Operation

In operation, the milk line 76 is under a vacuum that is transported through a vacuum channel in the milk hose 78 and milk claw 60 through the inflations to the cow's udder 44. The pulsator 40 periodically applies vacuum to the inflation forming the "milk period" and "rest period". During the "milk period", the vacuum is what "draws" the milk from the cow. If a vacuum was constantly applied on the cow's udder, the udder could be damaged. Therefore, it is necessary to "turn off" that vacuum at regular intervals during the milking process. Typically, that is on/off (milk/rest) ratio which is about between about 50% on-about 50% off to about 70% on-about 30% off. These cycles are typically in the order of between about 40 to about 60 times per minute.

This on/off cycle occurs within the inflation such that when the vacuum passing through the vacuum channel of the milk line 76 reaches the inflation 42, the inflation collapses under that vacuum and pinches off vacuum to the cow's udder 44. To open the inflation, the pulsator 40 applies an equal vacuum to the outside of the inflation 42 and pulls it open causing vacuum to flow to the cow's udder and retract the animal's milk. As the inflation 42 opens, vacuum will draw the milk from the cow's udder 44 where it is ultimately transported to the milk-receiving jar 90. To help move the milk thorough the system, one or more air bleed ports or control orifices are introduced in the system as discussed above including within the milking claw 60.

FIG. 1 illustrates diagrammatically the controller 104 for monitoring and controlling operating pulsators in a milking system. Controller 104 is typical of a controller which would be operatively connected to each one of all of the pulsators in the milking system. If the milking system has "N" milking apparatus, each milking apparatus would have a pulsator similar to pulsator 40. Thus, each milking system having "N" pulsators would also have "N" controllers, one for monitoring each of the pulsators. As discussed herein below in FIG. 7, each pulsator is operatively connected to and controlled through the controller by a system computer having a memory which has as stored data therein in the form of a stored reference signal representing a predetermined vacuum range of pulsating vacuum levels programmed as acceptable for all of the milking system pulsators. The system computer can control and/or program operation of all pulsators by setting, controlling a monitoring all parameters such as phase periods, pulsation factors and the like.

The controller 104 has a first input 102 having a first sensor 106 which is configured to be operatively connected to the pulsator 40 via vacuum test port lines 108 which are operatively connected to the pulsation line 50 of the pulsator 40. The pulsator 40 has controlling solenoids 54 which are operatively connected via power lead lines depicted by arrow 52 to the controller 104 to apply a 24 volt, direct current power 130 from the controller 104 to the operation of solenoids 54.

The controller 104 can control the application of power to and the removal of power from controller 40 via power lead lines 52.

The controller 104 includes a processor 110 having a control device 112 and a monitoring device 114. The processor 110 monitoring device 114 is operatively connected to the first input 102 for receiving from the sensors 106 a first signal representing a pulsating vacuum level from the designated pulsator 40. The processor 110 control device 112 includes a comparator for comparing the first signal to a stored reference signal representing a predetermined vacuum range of pulsating vacuum levels programmed as acceptable for all milking system pulsators. The processor 110 control device 112 generates at least one control signal when the designated pulsator 40 pulsating vacuum level is at a vacuum level outside of the predetermined vacuum range.

The control device 112 includes a control circuit which is responsive to at least one control signal for signaling that the designated pulsator 40 pulsating vacuum level is outside of the range of pulsating vacuum levels programmed as acceptable to the milking system pulsators. An alternative arrangement is discussed below with respect to block 552 in FIG. 15. The controller 104 including the processor 110 having the control device 112 and the monitoring device 114 can communicate with a remote computer via a communication system represented by arrow 134.

As is apparent from the above discussions, when a problem is detected in a pulsator there are a number of options available to an operator ranging from recording the event to having the computer disable the pulsator.

In FIG. 1, the control device 112 utilizes the control circuit to generate a signal by energizing a "red" illumination device to generate a visual signal that the pulsator has malfunctioned. The control device 112 then may disable or shut off the 25-volt direct current power to the solenoids 54 to deactuate and shut down the pulsator 40.

The processor 110 is configured to be able to control a designated pulsator by activating the pulsator to allow vacuum pulses from a source of vacuum pulses to be applied to the designated pulsator. In addition, the processor 110 is able to deactuate a designated pulsator to stop the supply of vacuum pulses being applied to the designated pulsator. If the pulsator determines that a designated pulsator has malfunctioned, in such event, the control device 112 disables the designated pulsator. Therefore, depending on the programming of the processor, the designated pulsator can be actuated or deactuated to control the application of vacuum pulses from a source of vacuum pulses. The use of the term "disabled pulsator" as used herein applies to a designated pulsator or monitored pulsator and is used to designate that an operating condition exists where the processor has made determination that the designated pulsator or the monitored pulsator is defective or has malfunctioned and is to be permanently "disabled", shut off or otherwise to be removed from the milking system.

In an alternative embodiment, the control device 112 can energize a "green" illumination device to generate a visual signal that the pulsator is operating within pulsating vacuum levels programmed as acceptable for the milking system pulsators.

In still yet another alternative embodiment, the control device 112 can energize a "yellow" illumination device to generate a visual signal that the pulsator is operating within pulsating vacuum levels programmed as minimally acceptable for the milking system pulsators.

Figure 2:
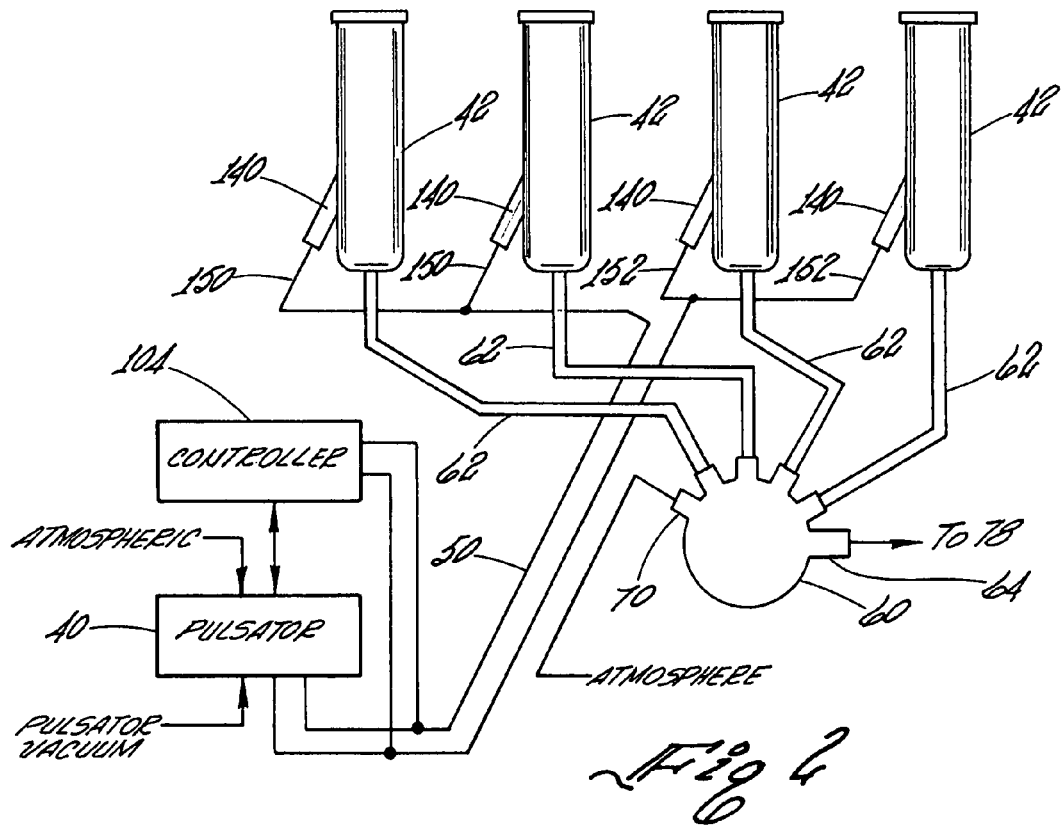
FIG. 2 is a pictorial representation of a milking apparatus comprising a milk claw and four inflations wherein each inflation has a teat cup having a shell and a teat cup liner provided in the shell to form a pulsation chamber between the teat cup liner and the shell and a pulsator for providing pulsation vacuum level pulses to each inflation and a controller using the teachings of the present invention for monitoring and controlling the pulsator.

FIG. 2 is a pictorial representation of a milking apparatus comprising a milk claw 60 and four inflations 42 wherein each inflation has a teat cup having a shell and a teat cup liner provided in the shell to form a pulsation chamber between the teat cup liner and the shell. The milking system includes the pulsator 40 for providing pulsation vacuum level pulses over line 50 to each inflation 42 via conduits 150 and 152 to the inflation nipples 140 and the pulsation vacuum level is applied as an input to the controller 104 for monitoring and controlling the pulsator 40.

Figure 3:
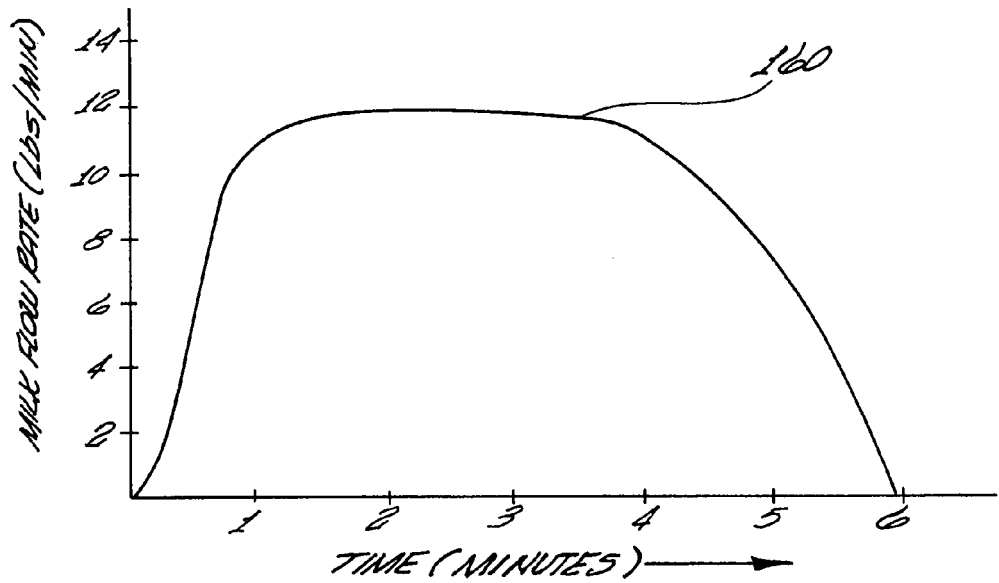
FIG. 3 is a chart plotting the milk flow rate as a function of time during a typical milking cycle of a cow.

Referring now to the chart illustrated in FIG. 3, the chart plots as curve 160 the milk flow rate as function of time during the above-described milking cycle of a cow using the data set forth in Table 1 above. Curve 160 shows that at the beginning of the milking cycle that maximum flow rate is reached with a minute or so. However, it takes about two minutes or so at end of the cycle to reduce to a zero flow rate. A typical milking cycle is about 6 minutes.

Figure 4:
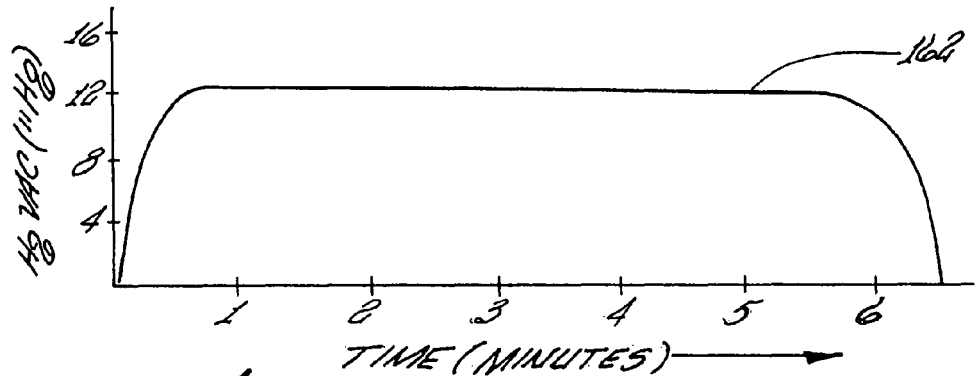
FIG. 4 is a chart plotting vacuum level of the vacuum source as a function of time during normal startup, operation of and shut-down of the vacuum system illustrated as part of FIG. 1.

In the chart illustrated in FIG. 4, the chart plots as curve 162 vacuum level operation established by the vacuum source as a function of time during normal startup operation and shutdown of the vacuum system during a 6 minute milking cycle. As illustrated, by curve 162 in FIG. 4, when the vacuum is turned on, it immediately reaches a preset vacuum level of 12 inches Hg (12" Hg) which is the desired vacuum level and remains at that level until the end of the milking cycle.

Figure 5:
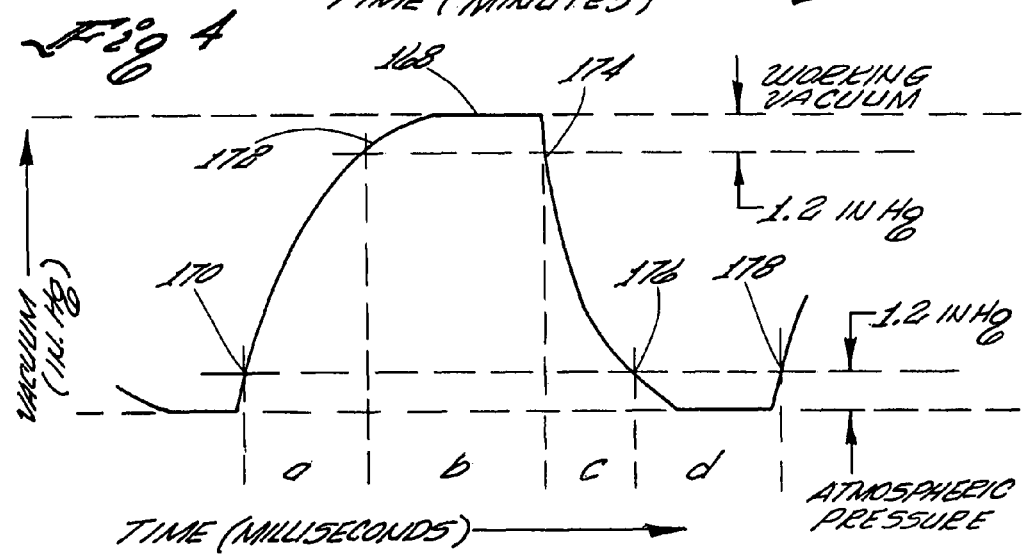
FIG. 5 is a pressure/time graph showing by means of a continuous line how the pulsating pressure in a pulsation chamber of a teat cup having a teat cup liner varies during a pulsation cycle.

In the pressure/time graph shown in FIG. 5, the continuous line 168 illustrates how the pulsating pressure in a pulsation chamber of a teat cup having a teat cup liner varies during a pulsation cycle. During an opening phase a, depicted by 170 the pulsating pressure is decreased from about atmospheric pressure to the milking vacuum or working vacuum as illustrated by 172. During the opening phase, the interior of the teat cup liner is open and milk can flow from the teat of a dairy animal.

During the open phase b, the vacuum remains substantially at the working vacuum. The duration of the open phase b is the time interval shown by 172 and 174. During the open phase, the interior of the teat cup liner is kept open.

A closing phase c follows the open phase b and the pulsating pressure increases from the milking vacuum or working vacuum level back to the atmospheric level and the time interval of the closing phase is shown by 174 and 176. The closing phase results in the interior of the teat cup liner closing. The closing phase d, sometimes referred to as the resting phase, is essentially at atmospheric pressure and the time interval is shown by 176 and 178. During the close phase d, the interior of the teat cup liner is kept closed.

A pulsation cycle comprising the phases a through d usually last between about 0.7 seconds to about 1.5 seconds.

Figure 6:
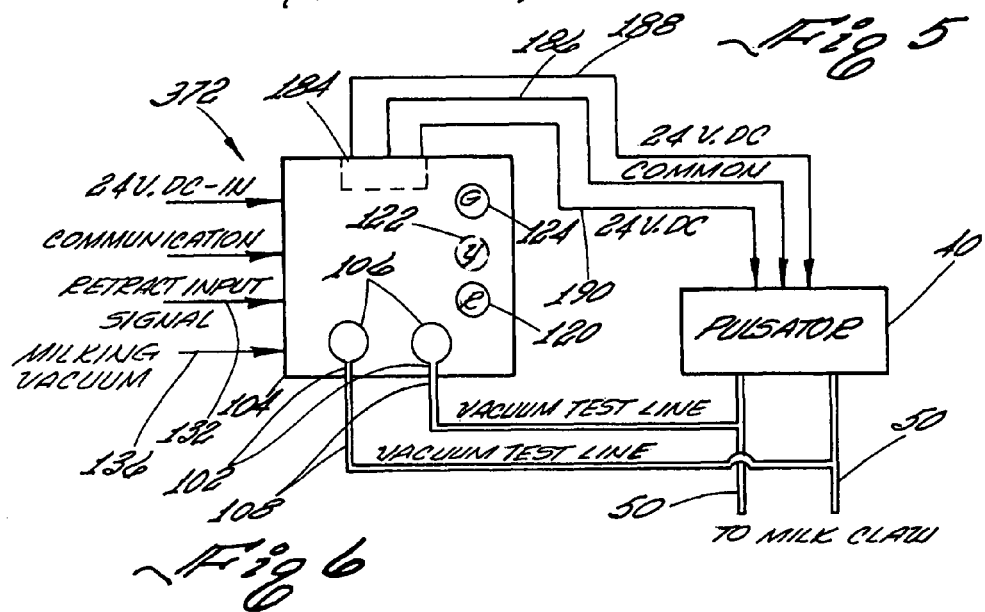
FIG. 6 is a schematic representation of a pulsator controller illustrated as being operatively connected to a pulsator of a milking apparatus.

In FIG. 6, the schematic representation of the controller 104 is illustrated as being operatively connected to a pulsator 40 of a milking apparatus. Since each milking apparatus has a pulsator, each pulsator will have a controller 104 operatively connected thereto to monitor and control operation of the pulsator 40 for the milk claw and inflations, as described above in connection with FIG. 1.

The controller 104 is operatively connected via a powered distribution device 184 to supply 24-volt direct current power over the common lead 186 and to power leads 188 and 190, respectively. In addition, the vacuum test lines 108 from the controller 104 are operatively connected to the pulsating lines 50. The pulsating vacuum level appearing on pulsating line 50 is carried by vacuum test lines 108 to the sensors 106. The controller 104 has a "red" illumination device 120 and a "green" illumination device 124 to visually indicate whether the pulsating vacuum level from a designated pulsator is operating outside of or within the range of pulsating vacuum levels programmed as acceptable for the milking system pulsators, respectively, all under control of a control circuit of the monitoring device 144 of FIG. 1. A yellow illumination device shown by dashed lines 122 may be used to signal that the pulsator vacuum level is at a minimum acceptable level for milking pulsator.

The controller 104 is operatively connected to a source of 24 volts, direct current power, to a communication system to communicate with a remote computer, shown generally by arrow 372, and to receive a retract input signal, which may in fact be a stop/start signal or milking/not milking signal generated by a sensing unit as described below in connection with FIG. 15, from the pulsator represented by the 132. Thus, the signal 132 as used herein represents a retract signal, stop/start signal or a milking/not milking signal as the case may be and depending on the application.

By using a stop/start signal or a milking/not milking signal, the system is independent from having to detect if a vacuum is presently and uses the stop/start signal or a milking/not milking signal for the system to know that a cow is being milked or not milked.

Figure 7:
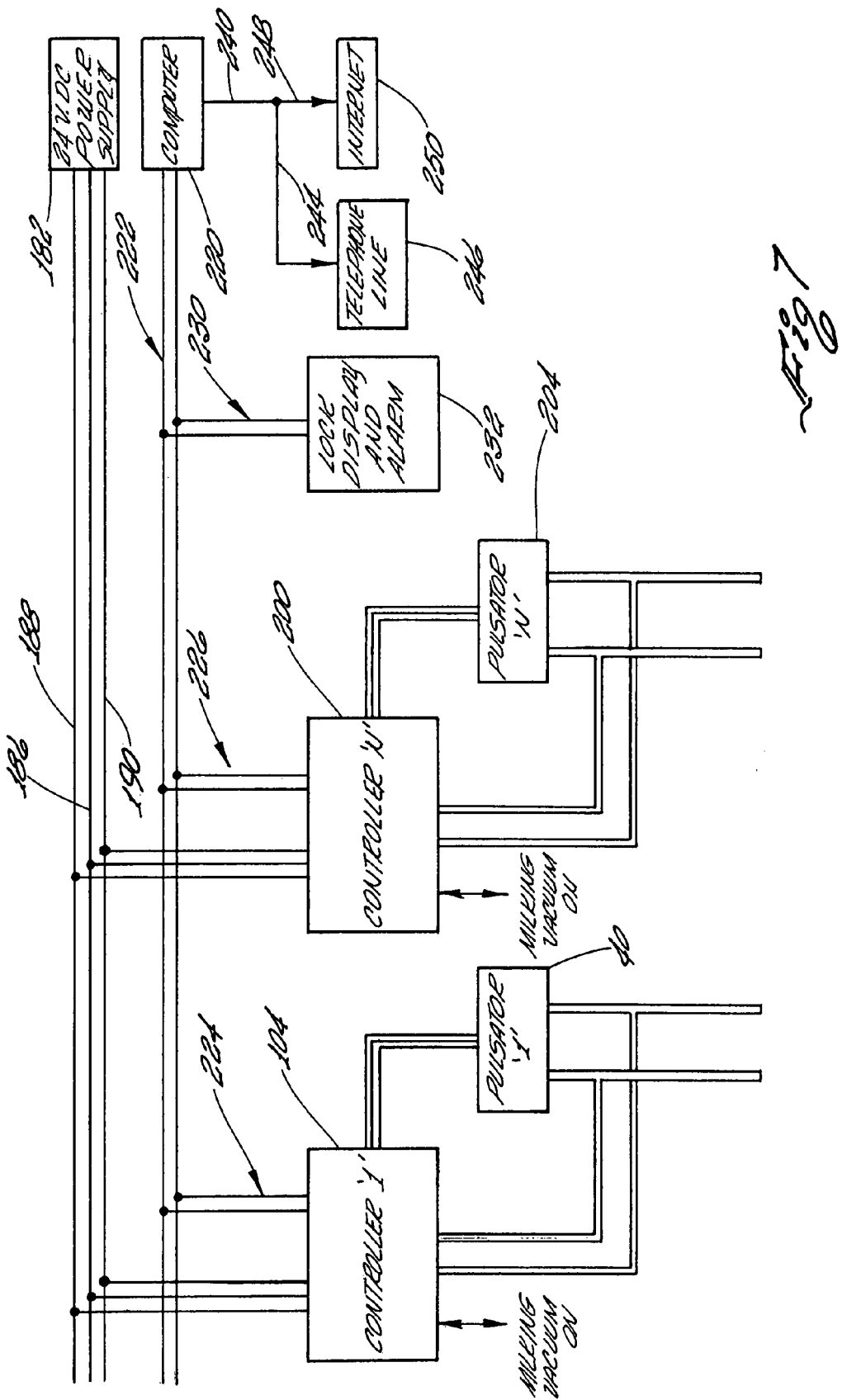
FIG. 7 is a schematic diagram of the overall data processing system for controlling and monitoring all pulsators in a milking system.

FIG. 7 is a schematic diagram of the overall data processing system for controlling and monitoring all pulsators in a milking system. The data processing system includes a computer 220 which functions as a system processor. The term "computer" is intended to include all ancillary components such as, without limitation, network servers, storage devices including rotating disk memory storage systems, modems, communication lines, digital subscriber lines ("DSL"), keyboards and the like.

The computer system is operatively connected by a communication system, shown generally by arrow 222 to each of the pulsator controllers in the milking system. In FIG. 7, milking system 1 is shown as having a pulsator "1", illustrated by 40, and a controller "1", illustrated by 104. The controller is operatively connected to a source of 24 volts direct current power 180 via power leads 186, 188 and 190. The controller "1" illustrated as 104 as operatively to the communication system 222 via conductors 224 to facilitate transfer data between the computer 220 and the controller "1" illustrated as 104. The controller "1" illustrated as 104 receives a signal indicating that the milking vacuum is on verifying that the milking apparatus has been attached to a dairy animal for milking and that a milking operation is to be performed. The signal 132 is described herein represents a retract signal, stop/start signal or a milking/not milking signal as the case may be and depending on the application.

Since a milking system has "N" milking apparatus, each of the milking apparatus has a controller, all of which are represented by controller "N" identified as 200 which are operatively connected to the communication system 222 via leads 226 and a pulsator "N" identified as 204. Controller "N" identified as 200 likewise receives an input signal verifying that the milking vacuum for the milking system having the controller "N" illustrated by 200 is ready to commence a milking cycle.

The computer 220 via communication system 222 is operatively connected to an annunciator 232 which functions as a locked display and alarm device. The annunciator 232 connected by leads 230 to the communication system 222 can be actuated by the computer 220 showing the operating addition of all "N" pulsators in the milking system.

For example, if controller "1" illustrated generates at least one control signal when the designated pulsator "1" depicted by 40 is at a vacuum level outside of the predetermined vacuum range programmed as acceptable for the milking system pulsators, the controller "1" illustrated by 104 may optionally de-energize the pulsator "1" thereby terminating operation of that milking apparatus and the "red" illumination device 120 will be illuminated on the controller "1" illustrated by 104 and the same information would be visually provided at a selected remote location on the lock and display alarm 232.

The computer 220 contains in the computer memory the stored reference signal representing a predetermined vacuum range of pulsating vacuum levels programmed as acceptable for milking system pulsators. The computer can bifurcate, under program control, the stored reference signal into a first set of pulsating vacuum levels representing a range of pulsating vacuum levels programmed as highly acceptable for milking system pulsators and a second set of pulsating vacuum levels representing a range of pulsating vacuum levels programmed as minimally acceptable for milking system pulsators. The number of levels is optional, and the goal is to identify a malfunctioning pulsator against a set of parameters or variables that are compared against a reference.

In the controller, the processor would then generate a highly acceptable control signal when the designated pulsator pulsating vacuum level is at a vacuum level within the predetermined vacuum range for pulsating vacuum levels programmed as highly acceptable for milking system pulsators and a minimally acceptable control signal when the designated pulsator pulsating vacuum level is at a vacuum level within the predetermined vacuum range for pulsating vacuum levels programmed as minimally acceptable for milking system pulsators.

The control circuit of the pulsator controller would then be responsive to the highly acceptable control signal and the minimally acceptable control signal for providing appropriate signaling representing whether the designated pulsator pulsating vacuum level is at a vacuum level within or outside of the predetermined vacuum range for pulsating levels programmed as acceptable for the milking system pulsators.

The computer 220 can be operatively connected via lead 240 to the internet 250 via lead 248 or to a telephone line 246 via a lead 244 to transfer data signals between the computer and a remotely located device, such as a network server, either over the internet or telephone line.

Figure 8:
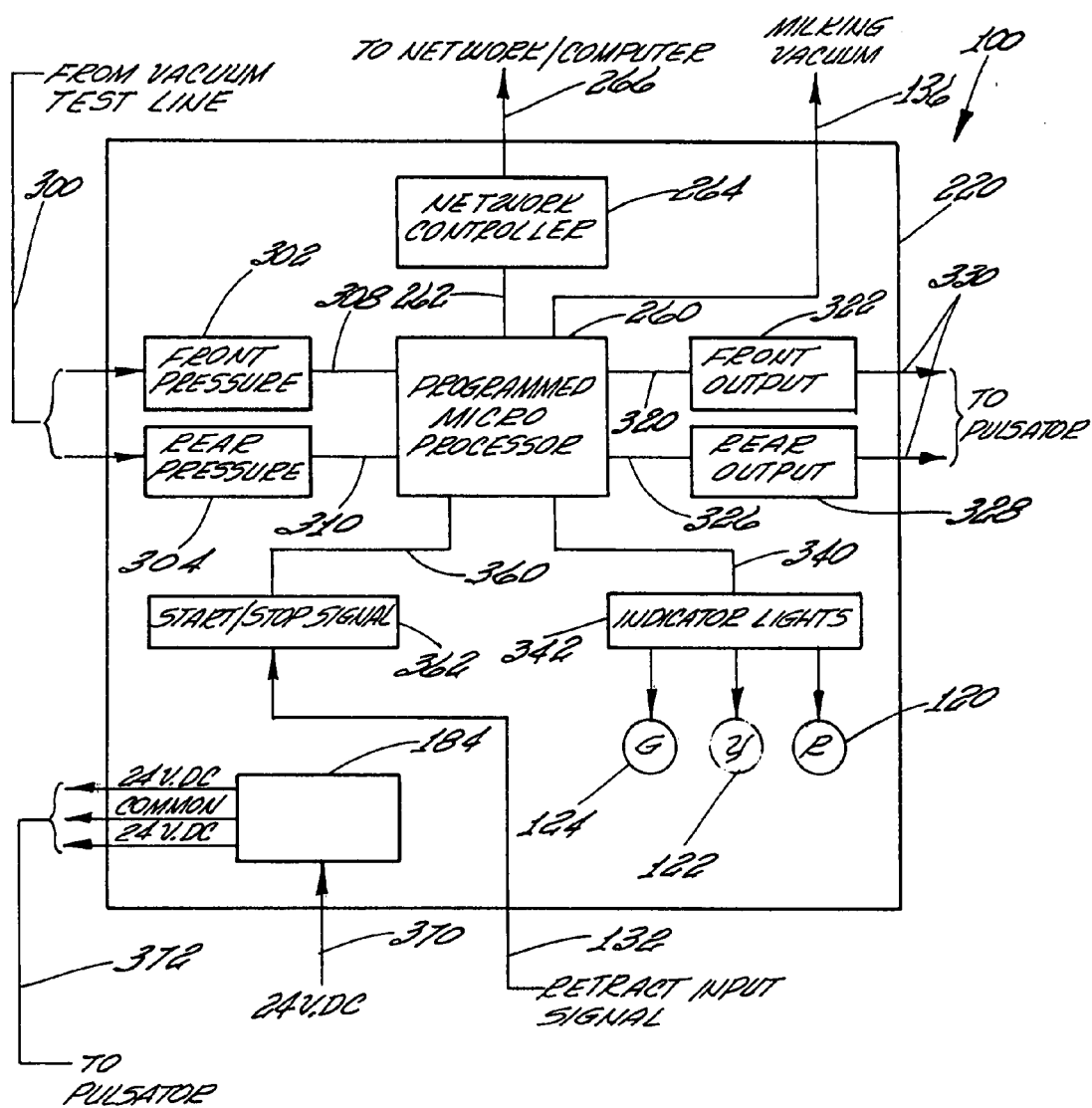
FIG. 8 is a detailed block diagram of a controller for practicing this invention.

FIG. 8 is a detailed block diagram of a controller 220 for practicing this invention. The controller 220 has a programmed microprocessor 260 which functions as a local processor in the controller 220. The microprocessor 260 receives a verification signal that the milking vacuum is on via lead 132. The microprocessor 200 communicates via lead 262 through a network controller 264 and lead 266 to a network computer 220 as illustrated in FIG. 7.

The microprocessor 260 receives a first signal representing a pulsating vacuum level for the front pair of inflations through a first input 302 and a pulsating vacuum level for the rear pair of inflation through a second input 304. The pulsating vacuum from the front and rear inflations are applied to inputs 302 and 304 via the vacuum test lines to the vacuum test ports as illustrated by lead 300. The first input 302 and a second input 304 have transducers or sensors which convert the pulsating vacuum level to a electrical signal which are applied via leads 308 and 310, respectfully, to the programmed microprocessor 260. The programmed microprocessor 260 controls the front output 322 of the pulsator via lead 320 and the output of the front output 322 is applied to the pulsator via leads 330. The programmed microprocessor 260 controls the rear output 328 of the pulsator via lead 326 and the output of the rear output 328 is applied to the pulsator via leads 330. The power to the controller 220 is provided by a 24 volt DC source 370. The retract input signal or the stop/start signal 132 is applied to the programmed microprocessor 260. The programmed microprocessor 260 controls the indicator lights 342 via led 340 to illuminate the appropriate red light 120, yellow light 122 and green light 124.

FIG. 9 is a flow chart showing the steps of method of using the pulsator controller for monitoring and controlling a pulsator. In FIG. 9, a start signal represented by flow chart item 400 and represents that a milking cycle is to commence. The processor within the controller retrieves or reads the stored reference signals from the computer representing a predetermined vacuum range of pulsating vacuum levels programmed as acceptable for milking system pulsators. Absent a stop signal which would be generated by a stop signal 132 and which is represented by flow chart item 412 is applied to the start 400 as represented by arrow 420, the milking cycle can commence and the controller has verified that a milking vacuum is present and that the milking apparatus is in fact attached to the dairy animal to be milked. In the alternative, the system may optionally include a sensor for determining the absence of or the presence of a milking vacuum, which is represented by item 416. The use of a stop/start signal or a milking/not milking signal eliminates the need for determining if a milking vacuum is present as represented by 416. If a milking vacuum represented by item 416 is present, a "yes" input 414 of is applied to the stop signal represented by flow chart item 412. In such event, the stop signal of item 412 applies a "yes" to the start signal of flow chart item 400 enabling the system to start since a milking vacuum is present. In the absence of a milking vacuum being present, a "no" signal represented by arrow 422 is applied as an input to the read pressure sensors and save data of flow chart item 422 and the system will then be disabled until a "yes" signal represented by arrow 414 is present enabling the stop signal 412 to advise the start signal 400 that a milking vacuum is present When all the inputs to the stop signal represented by flow chart 412 are yes, then the output from the stop signal flow chart 412 is no as represented by lead 422. Since all the appropriate inputs to the stop signal of flow chart item 412 are yes, no stop signal is required and for that reason a no appears on the lead 422.

The read pressure sensors and save data step as represented by flow chart item 424 is actuated sending an appropriate signal represented by lead 426 to the auto control mode represented by flow chart item 428. The auto control mode represented by flow chart item 428 can perform two functions based on whether or not an adjustment of timing of the pulsation cycle phases a through d is required. If an adjustment is required, then a yes signal is sent by auto control mode represented by flow chart item 428 via lead 430 to the step of adjust timing of phases a, b, c and d to read from memory as represented by flow chart item 436.

If the auto control mode represented by flow chart item 428 decides that no adjustment of timing is required, a no is communicated via lead 440 to bypass the adjust timing represented by flow chart item 436.

If an adjust timing is required as represented by flow chart item 436, the output is applied to the step of set front and rear output levels for the pulsators as represented by flow chart item 438. The step represented by flow chart item 436 will respond to either an adjust instruction from the adjust timing represented by flow chart item 436 applied to the set front & rear output 438 as represented by arrow 434 or to a no represented by lead 440. If an adjustment is not necessary, the step of responding represented by flow chart item 436 will then respond to the no received from the auto control mode of flow chart item 428 represented by lead 440.

The instruction performed by the flow chart item 436 is represented by lead 446 which is applied to the step of comparing to be performed by the processor as represented by flow chart item 448. The processor performs the step of comparing a first signal representing the pulsating vacuum level received from a designated pulsator to a stored reference signal, subject of flow chart item 402, representing a predetermined vacuum range of pulsating vacuum levels programmed as acceptable for milking system pulsators.

The instruction subject of flow chart item 448 is to set or enable a green, if present and available, a yellow or a red illumination device according to the pulsation state. In addition, instruction subject of flow chart item 448 would include disabling a designated pulsator which is determined by the controller. Also, in accordance with the instruction subject of flow chart item 448, a warning signal can be sent to a remote computer which monitors the entire milking system operation advising of the enabling of a yellow illumination device, if present, and warning of the enabling of a red illumination device which represents that the designated pulsator pulsating vacuum level is outside of the range of pulsating vacuum levels programmed as acceptable for all of the milking system pulsators.

In certain instances, the process may trigger a message sub-routine represented by: (i) flow chart item 406 which is responsive to a no instruction generated by the start signal of flow chart item 400 and (ii) message sub-routine 406' which is responsive to an instruction generated by the set in warning instructions generated by the flow chart item 448 which is applied via lead 450 to the message sub-routine represented by flow chart item 406', the output of which is applied back to the start signal instruction of flow chart 400, which output is represented by lead 456. The steps of the message sub-routine represented by flow chart items 406 and 406' are discussed below in reference to FIG. 10.

FIG. 10 is message sub-routine flow chart for flow chart item 406' of FIG. 9 showing the steps of method of using the pulsator controller for monitoring and controlling a pulsator. The message sub-routine flow chart of FIG. 10 also applies to the flow chart item 406 of FIG. 9.

In FIG. 10, the input to the message sub-routine 406 is represented by lead 450. The instructions is applied to a check data/instructions from computer represented by flow chart item 470. Upon completion of the instructions represented by flow chart item 470 the output is applied to a data/instructions step represented by flow chart item 474, the input to which is represented by lead 472. If the data/instructions represented by flow chart item 474 determines that no instructions are necessary as represented by lead 490, the no instructions is applied to the output represented by lead 482 from the message subroutine 406'. If instructions are required, a yes instruction is generated as presented by lead 478 and the yes instruction is applied to a process data/instructions from computer as presented by flow chart item 480. The output from the processing step represented by flow chart item 480 is then applied to the output represented by lead 482.

FIG. 11 is a pictorial representation of monitor in a computer system used for monitoring the pulsators in a milking system showing an alarm configuration display 500 for a designated controller. The alarm configuration display 500 discloses information relating to a designated pulsator which is one of a "N" number of pulsators in the milking system. The computer system can generate an alarm system display for every one of the "N" number of pulsators in the same format illustrated in FIG. 11.

In FIG. 11, the alarm configuration page 500 shows the setting rates and ratios, represented by 502, the setting system variables, represented by 504, the setting alarm parameters, represented by 508, if present, the minimum acceptable pulsating vacuum levels used for enabling a yellow illumination device is represented by 510 and the production of an unacceptable pulsating vacuum level signal which triggers the enabling of a red illumination device and the optionally disabling of a pulsator is represented by 512. In addition, the pulsating cycle times in milliseconds are represented by phase as shown by 514.

Figure 12:
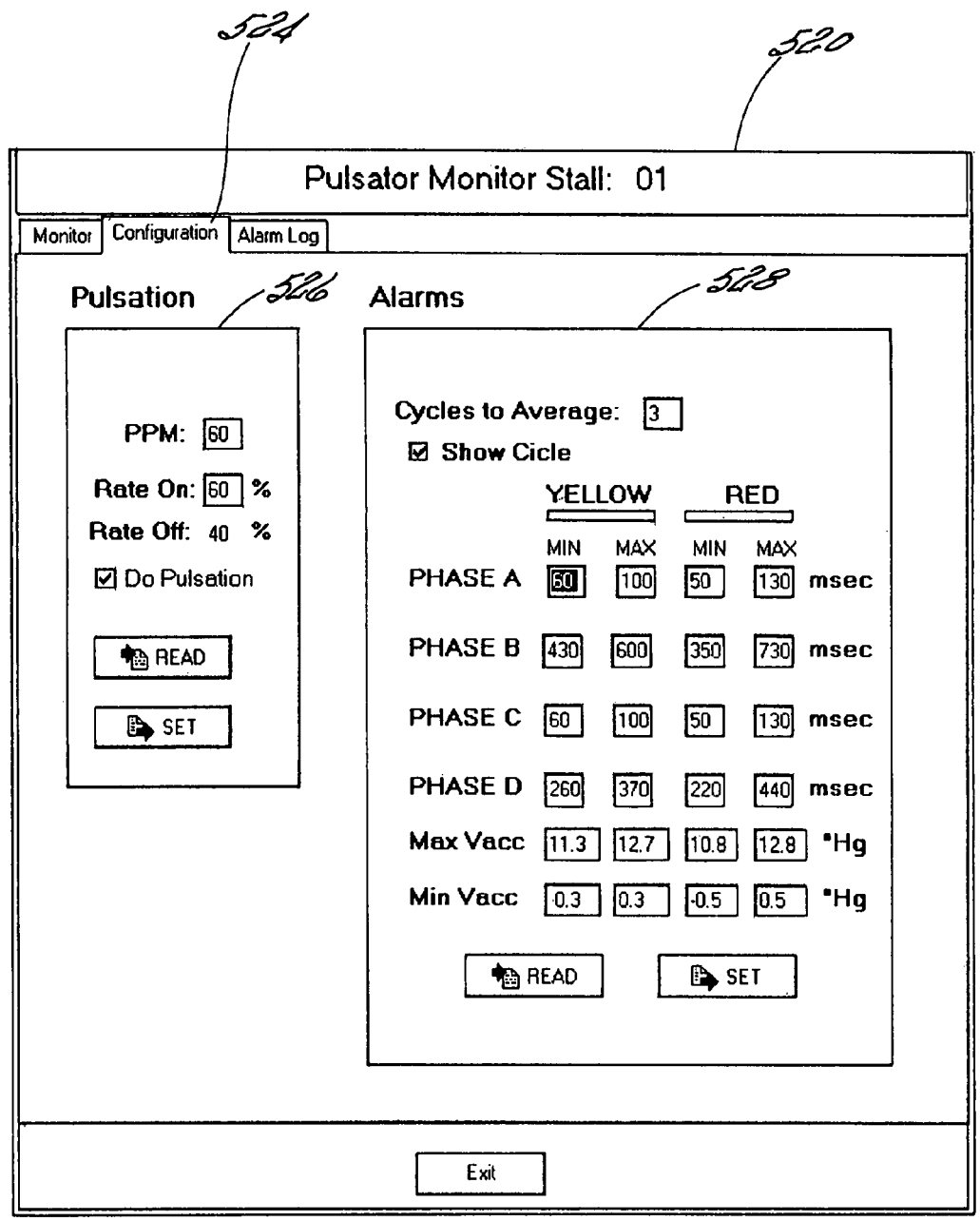
FIG. 12 is a pictorial representation of monitor in a computer system used for monitoring the pulsators in a milking system showing programmed stored reference signals to be applied to the processor from the computer system wherein the stored reference signal represents a predetermined vacuum range of pulsating vacuum levels programmed as acceptable for milking system pulsators.

FIG. 12 is a pictorial representation of monitor in a computer system used for monitoring the pulsators in a milking system showing on a display page 520 programmed stored reference signals to be applied to the processor from the computer system wherein the stored reference signal represents a predetermined vacuum range of pulsating vacuum levels programmed as acceptable for milking system pulsators and the pulsator configuration 524 controls the on/off time of the pulsators as depicted by the pulsation display section 526. In FIG. 12, the alarm levels are set in milliseconds for phases a through d and a maximum and minimum vacuum in inches of Hg as shown by the data in box 528. Box 528 shows that the monitored values are averaged over three cycles. If a yellow illumination device is present in the monitoring system, the information contained in box 528 designates the minimum and maximum times to trigger or enable the yellow illumination device.

A red illumination device is present in the monitoring system for the reasons discussed above. The information contained in box 528 designates the minimum and maximum times to trigger or enable the red illumination device. Also, the information contained in box 528 for the triggering or enabling the red illumination device can concurrently be used by the controller to optionally disable the designated pulsator when that designated pulsator pulsing vacuum level is at a vacuum level outside of the predetermined vacuum range programmed as acceptable for the milking system pulsators.

Figure 13:
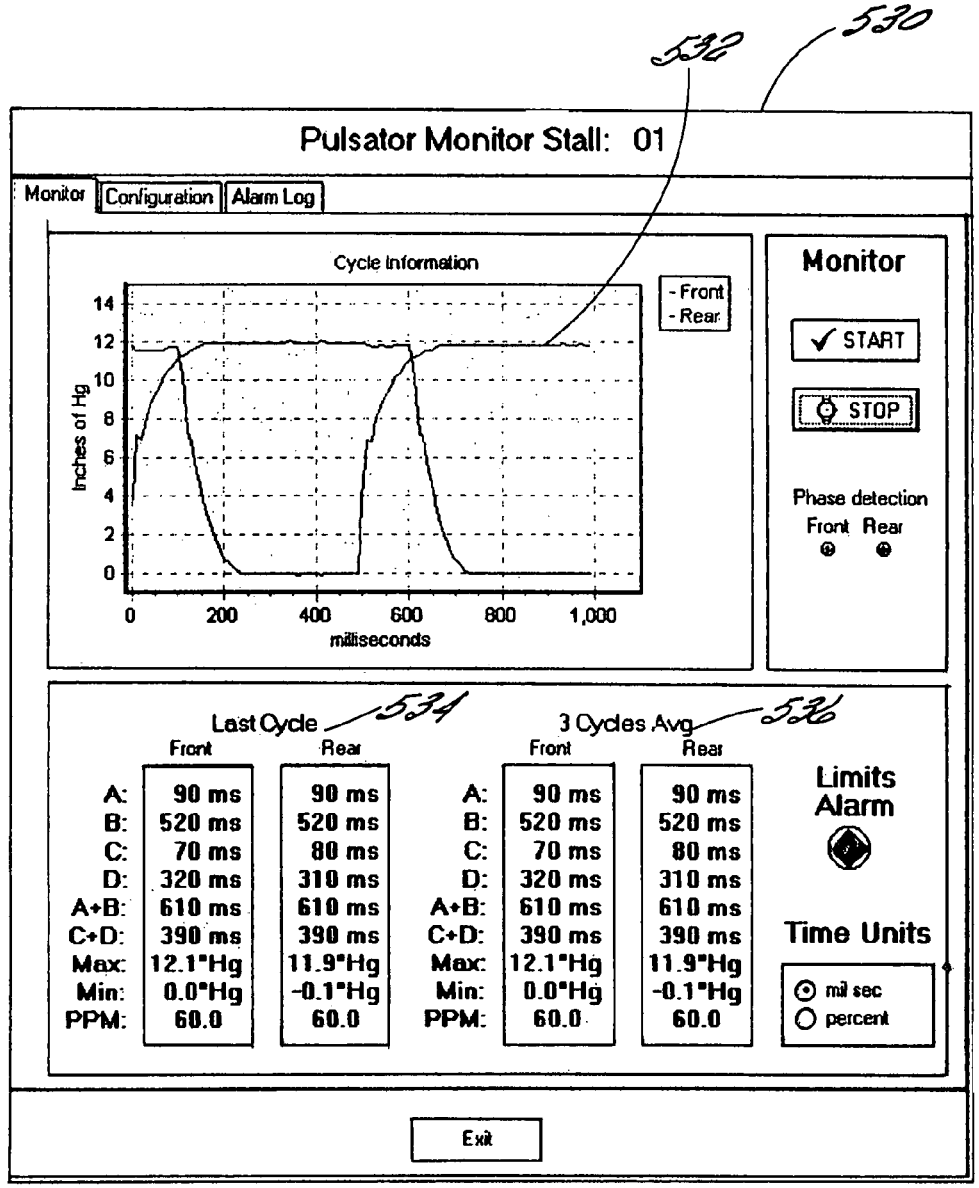
FIG. 13 is a pictorial representation of monitor in a computer system used for monitoring the pulsators in a milking system showing programmed phases of the pulsation cycle in milliseconds to be applied to all of the milking system pulsators.

FIG. 13 is a pictorial representation or monitor in a computer system used for monitoring the pulsators in a milking system showing on a display page 530 real time values applied to all of the milking system pulsators. In addition, a continuous line representing the pulsating cycle is displayed as line 532 on the monitor. This cycle information is available for each one of the "N" pulsators in a control system.

In addition, the display page 530 includes a section showing additional information about the periods of each of the pulsation cycle phases a through d as well as relevant information. The computer can display absolute data for the last cycle as represented by item 534 and can display the same information based on a three cycle average as represented by item 536.

Figure 14:
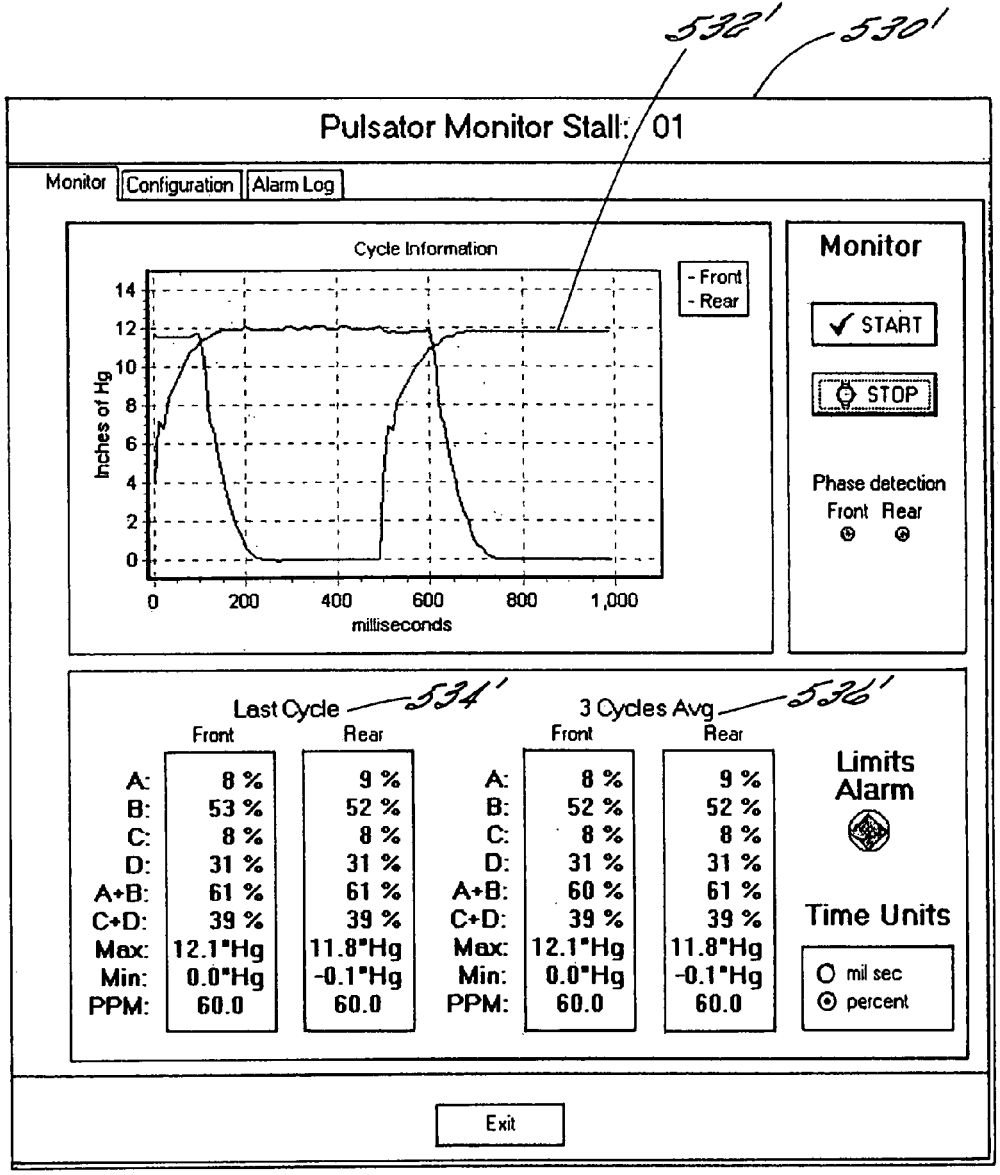
FIG. 14 is a pictorial representation of monitor in a computer system used for monitoring the pulsators in a milking system showing programmed phases of the pulsation cycle in percentage of a full pulsation cycle to be applied to all of the milking system pulsators.

FIG. 14 is a pictorial representation of monitor in a computer system used for monitoring the pulsators in a milking system showing a display page 530' programmed phases of the pulsation cycle in percentage of a full pulsation cycle to be applied to all of the milking system pulsators. The information displayed on the display page of 530' of FIG. 14 is substantially identical to the display page 530 of FIG. 13 except that the last cycle data represented by 534' and a three cycle average data by 536' is shown in percentages of the pulsating cycle. The displayed information relating to cycle information shown by line 532' is identical to the information shown by line 532 in FIG. 13.

The following examples are provided:

Pulsation Cycle Examples

| Example | Phase a | Phase b | Phase c | Phase d | Pulsator Ratio |
|---------|---------|---------|---------|---------|----------------|
| A | 10 | 50 | 20 | 20 | 60:40 |
| B | 10 | 55 | 20 | 15 | 65:35 |
| C | 10 | 40 | 20 | 30 | 50:50 |
| D | 18 | 44 | 15 | 23 | 62:38 |
| E | 12 | 48 | 12 | 28 | 60:40 |
| F | 10 | 60 | 15 | 15 | 70:30 |

The teachings of the present invention equally applied to a method and system for utilizing the controller for monitoring and controlling a pulsator as disclosed herein.

The pulsator controller can be used in a method for monitoring and controlling an operating pulsator in a milking system. The method comprises the steps of: producing with a first sensor a first signal representing the pulsating vacuum level from a monitored operating pulsator; comparing with a processor the first signal representing a pulsating vacuum level from the monitored operating pulsator to a stored reference signal representing a predetermined vacuum range of pulsating vacuum levels programmed as acceptable for milking system pulsators; and generating with a processor at least one control signal when the monitored operating pulsator pulsating vacuum level is at a vacuum level outside of the predetermined vacuum range.

In addition, the method may further comprise the step of signaling with a control circuit responsive to the at least one control signal that the monitored operating pulsator pulsating vacuum level is outside of the range of pulsating vacuum levels programmed as acceptable for the milking system pulsators.

In addition, the method may further comprise including signaling with a first signaling device in responsive to the at least one control signal that a monitored operating pulsator pulsating vacuum level is outside of the range of pulsating vacuum levels programmed as acceptable for the milking system pulsators.

In addition, the method may further comprise the step of disabling with the control circuit in responsive to the at least one control signal the monitored operating pulsator having a pulsating vacuum level outside of the range of pulsating vacuum levels programmed as acceptable for the milking system pulsators and has malfunctioned and is to be permanently disabled.

Also, the pulsator controller can be used in a system for monitoring a milking system. The milking system has a plurality of milking apparatus each having inflations and wherein each of the milking apparatus have a pulsator for controlling with pulsating vacuum the inflations when a milking apparatus is attached to a dairy animal and a milking vacuum is present in the milking apparatus. A source of milking vacuum is applied to each of the milking apparatus, e.g. one pulsator per milk claw per cow per stall. A plurality of pulsator controllers are included in the milking system and one of each of the pulsators is designated for a designated one of the plurality of milking apparatus. Each of the pulsator controllers comprise a power input for receiving electrical power; a first input operatively connected to a pulsator to be monitored in a milking system for receiving from the monitored pulsator a pulsating vacuum; a first sensor operatively connected to the first input for producing a first signal representing the pulsating vacuum level in the monitored pulsator; a processor operatively connected to the power input for receiving electrical power and to the first sensor for receiving the first signal, the processor including a comparator for comparing the first signal to a stored reference signal applied to the processor from a computer wherein the stored reference signal represents a predetermined vacuum range of pulsating vacuum levels programmed as acceptable for milking system pulsators, the processor generating at least one control signal when the monitored pulsator pulsating vacuum level is at a vacuum level outside of the predetermined vacuum range. A control circuit is responsive to the at least one control signal for at least one of signaling that the monitored pulsator pulsating vacuum level is outside of the range of pulsating vacuum levels programmed as acceptable for the milking system pulsators and disabling operation of the monitored pulsator pulsating vacuum level which is outside of the range of pulsating vacuum levels programmed as acceptable for the milking system pulsators.

The system may include the computer having the stored reference signals which represent the predetermined vacuum range of pulsating vacuum levels programmed as acceptable for milking system pulsators is operatively connected to each of the plurality of pulsator controllers by a communication system.

In addition, the system may include the control circuit being responsive to the at least one control signal for signaling with a first signaling device that the monitored pulsator pulsating vacuum level is outside of the range of pulsating vacuum levels programmed as acceptable for the milking system pulsators.

In addition, the system may include the processor generating at least one of an acceptable control signal when a designed pulsator pulsating vacuum level is at a vacuum level within the predetermined vacuum range programmed as acceptable for the milking system pulsators and an unacceptable control signal when a designed pulsator pulsating vacuum level is at a vacuum level outside of the predetermined vacuum range programmed as acceptable for the milking system pulsators.

In addition, the system may include the control circuit being responsive to the unacceptable control signal for signaling with a first signaling device that the monitored pulsator pulsating vacuum level is outside of the range of pulsating vacuum levels programmed as acceptable for the milking system pulsators.

In addition, the system may include the control circuit being responsive to the acceptable control signal for signaling with a second signaling device that the monitored pulsator pulsating vacuum level is within the range of pulsating vacuum levels programmed as acceptable for the milking system pulsators.

In an overview, the computer controller monitoring and control is operable to control one component in a milking system. For example, if a pulsator controller signal to the computer that a yellow illumination device is activated or enabled, the computer can tract the pulsator and independently generate a warning signal in response to a programming monitoring criteria.

Controller for Controlling and Monitoring an Operating Pulsator

As shown in FIG. 1, the embodiment of the controller 104 includes a processor 110 having a control device 112 and a monitoring device 114. The monitoring device 114 is operatively connected to the first input 102 for receiving from the sensors 106 a first signal representing a pulsating vacuum level from the designated pulsator 40. The control device 112 includes a comparator for comparing the first signal representing a pulsating vacuum level from the designated pulsator 40 to a stored reference signal representing a predetermined vacuum range of pulsating vacuum levels programmed as acceptable for all milking system pulsators. The control device 112 generates at least one control signal when the designated pulsator 40 pulsating vacuum level is at a vacuum level outside of the stored reference signal representing a predetermined vacuum range of pulsating vacuum levels programmed as acceptable for all milking system pulsators.

Figure 15:
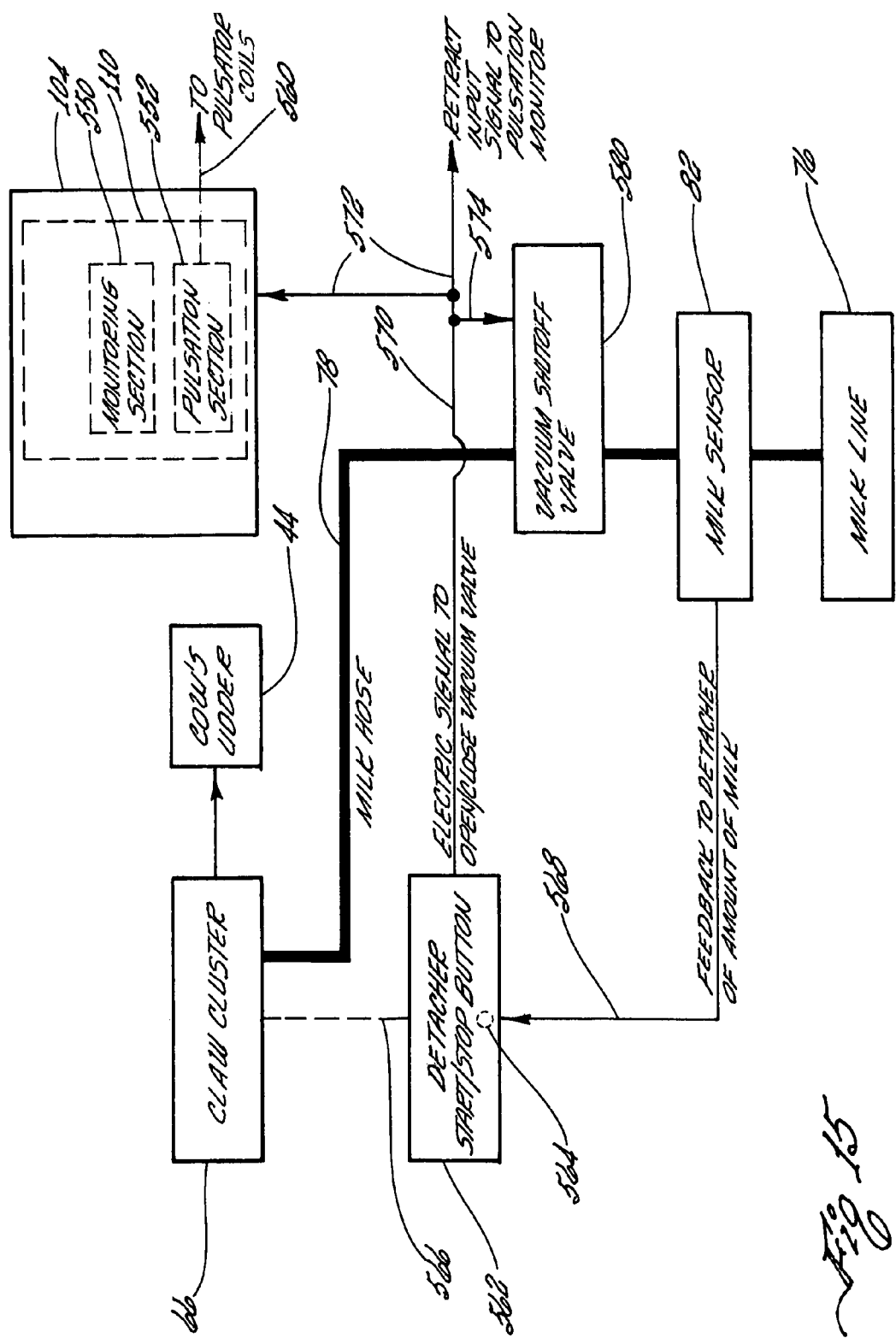
FIG. 15 is a block diagram illustrating another embodiment of the processor controller wherein the processor includes a control section, a monitoring section and a pulsation section and wherein the milking system includes a detacher for generating a "start signal" and a "stop signal" and a vacuum shutoff valve.

In FIG. 15, the controller 104 is configured such that the processor 110 includes a control section 112 and a controlling and monitoring system having two sections, namely a monitoring section 550 and a pulsation section 552.

The monitoring section 550, as described above, basically uses the sensors 106, as vacuum test ports, to read vacuum levels and to generate a first signal representing the sensed vacuum levels. The processor 110 then uses the first signal for operating decisions. The monitoring section 550 calculates the value of phases A, B, C and D and compares the calculated values therefor with stored reference signals, e.g. limits, to trigger events or alarms.

The pulsation section 552 performs the function of opening and closing pulsator valves 54 shown in FIG. 1 in order to create or establish a pulsation cycle such as the pulsation cycle depicted in FIG. 5. In FIG. 1, the coils 54 are part of a pulsator 40 and when energized will mechanically open a valve connected between the pulsation line 36, sometimes known as a vacuum pipe, and the vacuum test port lines 108, sometimes known as pulsation vacuum hoses, as shown in FIG. 1. This enables a vacuum to pass from the pulsation vacuum pipe 36 to the pulsation vacuum hose 108.

The pulsator 40, which is controlled by the pulsation section 552 as depicted by arrow 560, intermittently applies pulsating vacuum pulses through the flexible conduit 50 from within the shell (outside the liner) of the inflation 42 and creates a vacuum to "pull" to "open" the inflation 42 away from or releasing the teat of the cow 44 making the teat open so that the vacuum from the milk claw 66 draws milk down thorough the teat. This is referred to as a "milk period". As described above, alternatively atmospheric pressure is applied by the pulsation 40 to the liner to "push" or "close" the inflation 42 against the teat of the cow 44 closing off the teat all shown in FIG. 1. This is referred to as a "rest period". The pulsator 40 periodically draws air out of the inflation 42 by application of pulsating vacuum pulses at a controlled vacuum level to create the cycle of opening and closing of the teat cup liner. This creates a situation of milking (teat under vacuum) and rest (teat not under vacuum).

The energizing and de-energizing of coils 54 is performed by the pulsation section 552 via control 560 which controls the energizing and de-energizing of coils 54 according to a preset rate or programmed rate or programmed sequence. For example, the programmed rate having an on/off ratio of 60/40 is depicted by the pulsation display section 526 on the left side of FIG. 12.

The pulsation section 552 may perform or enable the pulsation to occur independently in a preprogrammed manner or ratio without any feedback or feed back signals from the monitoring section 550. However, it is envisioned that the pulsation section 552 may be programmed to modify or change the pulsation ratio or pulsator settings "on the fly" or in real time in order to compensate for possible errors detected by the monitoring section 550. In certain circumstances, it may not be practical to modify or change the pulsator ratio or pulsation setting because some of the detected pulsator problems cannot be remedied or overcome by changing, modifying or otherwise re-programming the programmed pulsation rate and/or ratio. In the preferred embodiment of the controller 104 as described above in connection with FIG. 1, the pulsating function is programmed to operate at a preselected ratio or rate and the pulsator ratio or rate is not "controlled" by the monitoring section 550 or the pulsating section 552. The monitoring section 550 is configured to detect when a pulsator problem exists and to inform a user when an operating problem is detected.

Thus, in the preferred embodiment, the monitoring section 550 is independent of the pulsation section 552.

In the alternate embodiment of the controller 104 as described above in connection with FIG. 15, the pulsation section 552 can be responsive to feedback, feedback signals or control signals depicted by arrow 556 from the monitoring section 552 to the control 112 to modify, change, vary, deactuate or otherwise re-program the programmed operation of the pulsator section 552 which controls the pulsator 40 via control 560. This would enable or permit a computer system, e.g. micropulsator processor 110 or a separate or remote computer system 220, as shown in FIG. 7, to program, re-program or control the pulsator section 552 as depicted by arrow 558. The pulsation section 552 is responsive to control, actuate, deactuate or otherwise control its associated pulsator 40.

For example, a pulsator 40 can be programmed or operated by an electronic pulsation system, e.g. coils 54, that are programmed, operated or run by an electronic pulsation system. The pulsator can be monitored by the monitoring section 550 as is known to person's skilled in the art. Thus, the pulsator controller 104 depicted in FIG. 15 can be programmed to: (i) perform both a monitoring function and a pulsation control function, (ii) just perform a monitoring function and not perform a pulsating control function, or (iii) the pulsator controller 104 can just perform the pulsating control or programming function and not perform the monitoring function.

In summary, the pulsator controller 104 of the present invention can use the monitoring section 550 or the pulsation section 552 alone or in combination to monitor and/or control and/or actuate and/or deactuate the pulsator vacuum to the pulsator 40 and/or monitor, detect, and/or signal and/or report a pulsator 40 malfunction. In certain instances, the pulsator controller 104 can include a processor operatively connected to a memory or to a remote computer 220 having a memory for storing pulsator malfunction criteria as a reference table and stored reference signals representing a predetermined vacuum range of pulsating vacuum levels programmed as acceptable for milking system pulsators. The processor 110 can be programmed to disable a malfunctioning pulsator as a "disabled pulsator" as discussed above.

The processor 110 is operatively connected to the first sensor for receiving the first signal representing the pulsating vacuum level from the designated pulsator 40. The processor 110 would include a comparator for comparing the first signal to the stored reference and the processor would generate at least one control signal when the designed pulsator pulsating vacuum level is at a vacuum level outside of the predetermined vacuum range. At least one information signal may be generated by the processor from the pulsator malfunction criteria reference table identifying the pulsator malfunction represented by the at least one control signal.

Controller for Monitoring and Controlling an Operating Pulsator in a Milking System having a Start Signal as a Verification Signal and a Stop Signal Generally the function of controlling pulsation and of monitoring the pulsator 40 can be achieved by including or incorporating all of the necessary or required electronics or components in an electronic board. This structure or configuration provides the pulsator controller 104 with another important operating feature; that is, the pulsation section 552 is capable of stopping or interrupting the pulsation when a cow, as depicted as cow's teats 44, is not being milked. The pulsation section is responsive to a "start signal" to start the pulsation control and monitoring function. The "start signal" is essentially a verification signal that the milking apparatus has been attached to the cow to be milked.

Typically a pulsation system has just one or a single "controller" for operating all of the dairy pulsators in a milking system. Such a design is economical as the use of a single controller reduces the cost of the dairy milking system components. One problem associated with a one or single "controller" configuration for operating all of the dairy pulsators is that all pulsators must be operating all of the time. Therefore, a user cannot start or stop any one of the dairy pulsators at the same time to accommodate for the fact that every cow starts and ends a milking cycle at different times.

In the present invention, each pulsator 40 has a controller 104 insuring that, in the milking system using the teachings of this invention, there is one controller per dairy pulsator. One advantage of this configuration is that a user or dairyman can now operate or program the operation of the pulsation for each pulsator 40 independently per pulsator which can be performed for each cow. When a cow is being milked, the specific or designated pulsator for the cow can be independently activated. This results in reducing the "wear and tear" on each pulsator, which is both desirable and economical.

Start Input Signal

As discussed above, the pulsation controller 104 has an input referred to herein as a "start signal". The "start signal", or input signal, is shown in FIG. 1 as 136 which is labeled "milking system on". The "start signal" can be developed from a variety of input devices or sources, all of which are well known to persons of ordinary skill in the art. One example of a device for generating or producing a "start signal" or a "milking signal" is a Flow Nexus scanner sold by Beco Dairy Automation Inc. which starts a clock in response to a start signal or milking signal which is generated when a milking apparatus attached to a cow commences a milking cycle. The clock stops at the end of a milking cycle and the milking time can be displayed.

In FIG. 15, a detacher 562 is responsive to the vacuum in the claw cluster 66 via conduit 566 and to a feedback signal depicted by arrow 568 from the milk sensor 82 depicting the amount of milk sensed by the milk sensor 82 to shut off or move the stop/start button to a "stop" position in the detacher 562 in response to the control signal 568 from the milk sensor 82.

As discussed above in connection with FIG. 1, the milk claw outlet 64 is operatively connected to a milk transport conduit, shown generally as 72. The milk transport conduit 72 includes a semi-flexible hose 78 operatively connected to a nipple inlet 80 of a milk line 76. A vacuum shut off valve, known as a VSO valve 580, shown in FIG. 15, may be located in the milk transport conduit 72 between the milk hose 78 and milk line nipple 80. The VSO valve 580 is normally open when a cow is being milked enabling the milk to pass to the milk line 76. When a cow is not being milked, the VSO valve 580 is closed. When the VSO valve 580 is closed, there is no vacuum present at the liners 70 shown in FIG. 1. Therefore, the milk claw 66 attaches to the cow because the milk claw 66 will not attach to the cow's teats 66 and the milk claw 60 will fall off of the cow.

The use of a VSO valve is exemplary and a "stop" signal or a "start" signal can be generated using sensors or other devices such as for example external electronic boards to detect milking or not milking.

The detacher 562 has a manual mode, e.g. where the stop/start button depicted by dashed circle 564 is manually actuated to the "stop" position. The detacher 562 has an automatic mode, e.g., where the detacher'senses that the cow has reached the end of a milking cycle via the control signal 568 from the milk sensor 82, that automatically actuate the stop/start button 564 into the "stop" position.

A user can actuate the stop/start button 564 of the detacher 562 to the "start" position. In response, the detacher 562 automatically sends a signal depicted by arrow 570 and 572 to open the VSO valve 580. When the user actuates the stop/start button 564 of the detacher 562 to the "stop" position, the detacher 562 sends a signal via 570 and 572 to close the VSO valve 580.

An end of a milking cycle results in the closing of the VSO valve 562 and this is determined by the user actuating the stop/start button 564 into the "stop" position (detacher in manual mode), or can be determined by the detacher 562 itself (detacher in automatic mode).

The pulsator controller 104 monitors the VSO valve 580 status through the signals on line 572 which is used as the input signal 136. For purposes of this discussion, this input signal 136 is sometimes referred herein as the "start signal".

In operation, by knowing the status of the VSO valve 580 or monitoring the position of the "stop/start" button 564 of the detacher 562, the user knows if a cow is being milked or not being milked at any time. When the "stop/start" button 564 is in the "start" position, a "start signal" is produced. When the "stop/start" button is in the "stop" position, a "stop signal" or "end of milking cycle signal" is produced.

Line 572 transmits the "start signal" or the "stop signal" to the input signal line 136, shown in FIG. 1, of the controller 104.

As such, signal line 136 functions as a system input for the controller 104 enabling the processor 110 to respond to the "start signal" or "stop signal", as the case may be.

In the embodiment of FIG. 15, the processor 110 is responsive to a start signal applied to the input or system input to concurrently enable operation of the designated pulsator to supply vacuum pulses to a milking apparatus and to commence monitoring of said first signal representing the pulsating vacuum level from the designated pulsator. In addition, the processor is responsive to a stop signal applied to the input or designated pulsator from receiving a supply of vacuum pulses from a source supplying vacuum pulses to a milking apparatus and to disable monitoring of the first signal representing said pulsating vacuum level from the designated pulsator.

The pulsator controller 104 uses that input signal 136 as "start signal" for several functions: (i) to operate the monitoring and/or pulsating functions only when a cow is being milked; and (ii) to collect milking data such as start of milking cycle, end of milking cycle, volume of milk and the like and enabling the data and/or information to be stored as stored information in a computer or memory and to be analyzed and/or used for dairy management purposes. Each of these functions are discussed hereinbelow.

Operation of the Monitoring and/or Pulsating Functions only when a Cow is being Milked The monitor pulsation system has can be operated during the monitoring function and/or pulsating function only when a cow is being milked. The advantages of monitoring only when a cow is being milked are:

(a) The pulsation cycles, phases A, B, C and D values, are different when a cow is attached to the milk claw, the "attached mode" than when a cow is not attached to the milk claw, the "unattached mode". It is better to program alarms limits only for the "attached mode". If the alarms limits are programmed to accommodate both the "attached mode" and the "unattached mode", the total alarm limits bandwidth is wider that the bandwidth for the "attached mode" alone. As a result, the alarm or vacuum level limits will have a wider bandwidth and this may result in some desired limit values or vacuum reference values for alarm limits being exceeded or missed due to the wider bandwidth. Thus, by monitoring the cow only in the "attached mode", the bandwidth of the alarm limits is tighter and the alarm limits can be more precisely programmed in the "attached mode" which is highly desirable to a dairyman.

(b) The pulsation systems may be shut-off or in the "off mode", when a cow is not being milked. If the monitoring function is enabled with the pulsation system in the "off mode", the monitoring system would continue to monitor even though the pulsator is in the "off mode". The monitoring system would detect a problem with the pulsator because the pulsator is not in an "on mode" for milking a cow even though the pulsator is in fact in the "off mode" as a cow is not being milked.

In the embodiment of the controller 104 depicted in FIG. 15, the pulsation section 552 performs or controls the pulsation control function of the pulsator 40 via control 560 through the coils 54 which are powered by the 24 VDC and common electrical leads as depicted in FIG. 1. In operation, when the milking system is in the "off mode", the pulsators are in the "off mode", e.g. deactuated. Therefore, in the embodiment depicted in FIG. 15, the monitoring section 550 is placed in the "off mode" to disable the monitoring function and to avoid triggering a false alarm.

One advantage of the embodiment depicted in FIG. 15 is that when the milking system is in the "off mode" and the pulsators are in the "off mode", a significant amount of "wear and tear" on all of the pulsators is eliminated. In a typical milking operation and for about 50% of the time, there is no cow being milked in a stall.

Accordingly, when a cow is not being milked, a controller 104 is responsive to a "stop signal" or an "end of milking cycle signal" for placing the pulsators in the "off mode" and this is highly desirable to a dairyman from both a cost aspect and a maintenance aspect due to the reduction in the "wear and tear" on the pulsators.

In addition, the controller 104 is also responsive to a beginning of milking cycle signal or a "start signal" designating commencement of the milking cycle for a single cow in a single stall which actuates or enables a designated pulsator for that specific cow being milked in a designated stall. As such, this is also highly desirable to a dairyman.

This eliminates actuating all of the pulsators for all cow-milking claws at the same time thereby insuring that the pulsation is not "synchronized". In this embodiment of the controller 104 depicted in FIG. 15, every stall starts and ends pulsation at different times depending on the occurrence of the "start signal" for that designated cow in the designated stall. As a result of the non-synchronization of the pulsators, there is less vacuum fluctuation in the main vacuum line.

Collecting and Storing Data from Milking Events

The monitoring section 550 of the controller 104 sends signals via communication link 134 to a remote computer or to a main computer representing events such as for example, the "start signal", the "end of milking cycle signal", event signals such as detected alarms or problems in the pulsator. This information and data is stored in a memory of the main computer, or in the alternative, in a memory in the controller, e.g., the memory used for the programmed microprocessor processor 260 shown in FIG. 8. Such information and data is in the form of a history that a dairyman can use for management decisions.

Figure 16:
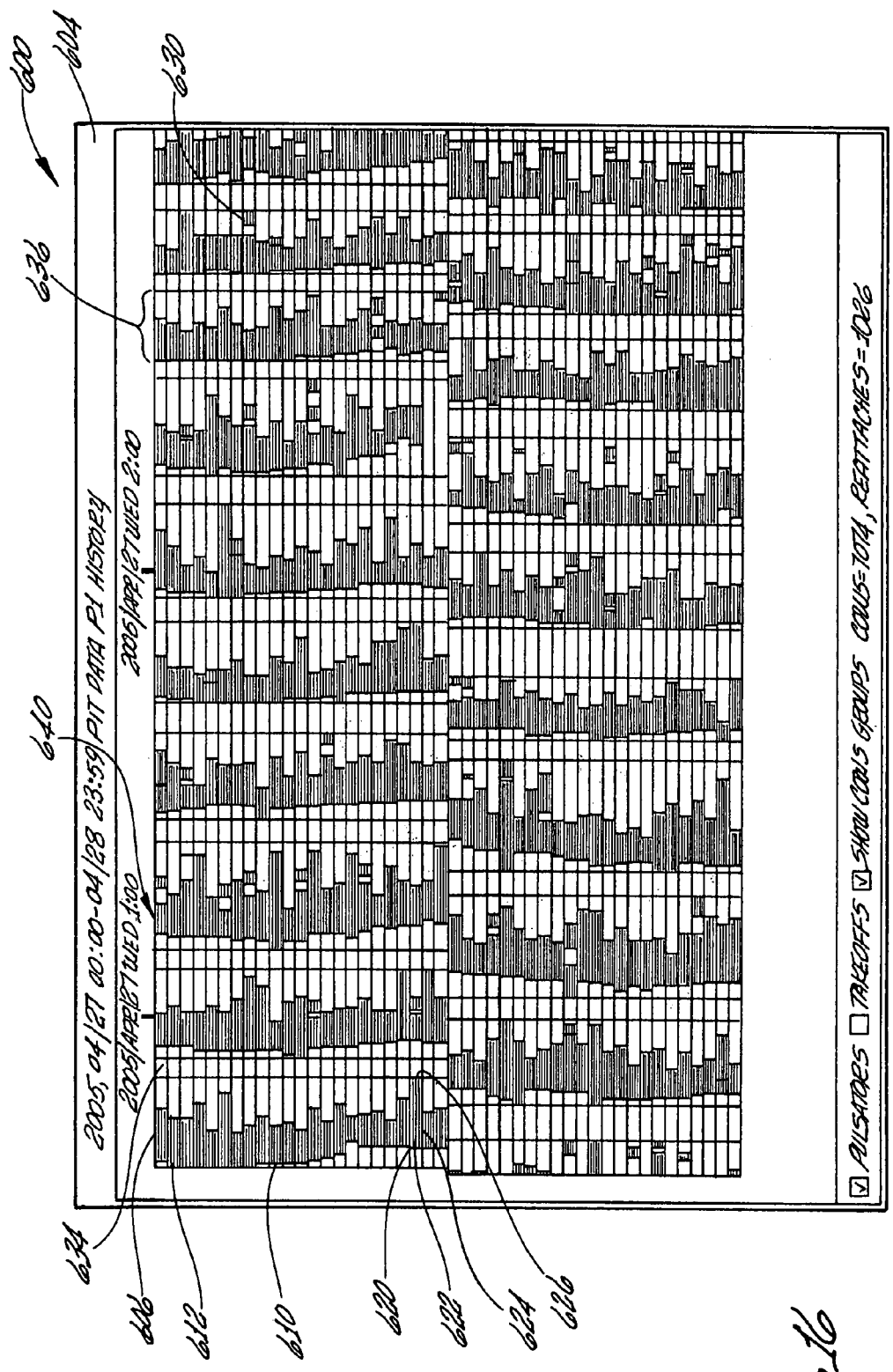
FIG. 16 is a graphical representation of a display device having a window showing how data and information stored in the computer can be displayed for use as management information by a dairyman.

The Table illustrated FIG. 16 is an example of how the data and information is stored in the computer and how that data and information can be displayed by an appropriate output device having a screen depicted by arrow 600. The main computer software can be programmed for the desired display of the stored information in the computer memory.

The screen 600 displays a window 604 showing the displayed information derived from the stored data or information in the memory. In the display of FIG. 16, the horizontal axis 606 depicts the time of day with each "tick" representing a minute. The vertical axis 610 represents the stall for each cow being milked, by individual stall number, as illustrated by arrow 612.

When the detacher 562 generates a "start signal", the "start signal" is shown by arrow 620 for stall 622. The "start signal" represented by arrow 620 is the beginning of a rectangular shaped graphic representation 624 depicting a milking cycle for the designated cow in stall 622.

When the detacher 562 generates a "stop signal", representing the end of a milking cycle", the "stop signal" is shown by arrow 626 for stall 622. The "stop signal" represented by arrow 626 is the end of the rectangular shaped graphic representation 624 depicting a milking cycle for the designated cow in stall 622. As such, each cow being milked in a designated stall is represented by a rectangular shaped graphic representation similar to 624.

A square shaped graphic representation 630 depicts that a problem was detected in that pulsation for that stall by the monitoring section 550.

A significant amount of management data and information can be extracted from the Table depicted in the display 600. For example, the dairyman can check how long it takes to change cows as depicted by area 634, how long it takes to milk a string of cows as depicted by area 636 or the order in which the dairyman's milkers attached the milking claws to the cows which is depicted by the variation in the alignment of the "start signals" depicted by arrow 640.

Thus, the software systems for the present invention differs from the known software systems in that the system disclosed and taught herein also shows pulsation alarms in the window 604 of display 600.

Software Flow Diagram for Changing Programmed Vacuum Levels, Pulsator on/off Ratios and Pulsation Pulses As discussed above, a stored reference signal representing a predetermined vacuum range of pulsating vacuum levels is programmed in the form of data/instructions from a computer. The programmed vacuum levels can be changed by computer programming at any time. In operation, the programmed vacuum levels can be changed by computer programming prior to the start of a milking cycle or during a milking cycle. The programmed vacuum levels are the pulsating vacuum levels acceptable for milking system pulsators.

The data instructions from the computer can be also used to change pulsator on/off ratios and to change the pulsation pulses.

Figure 17:
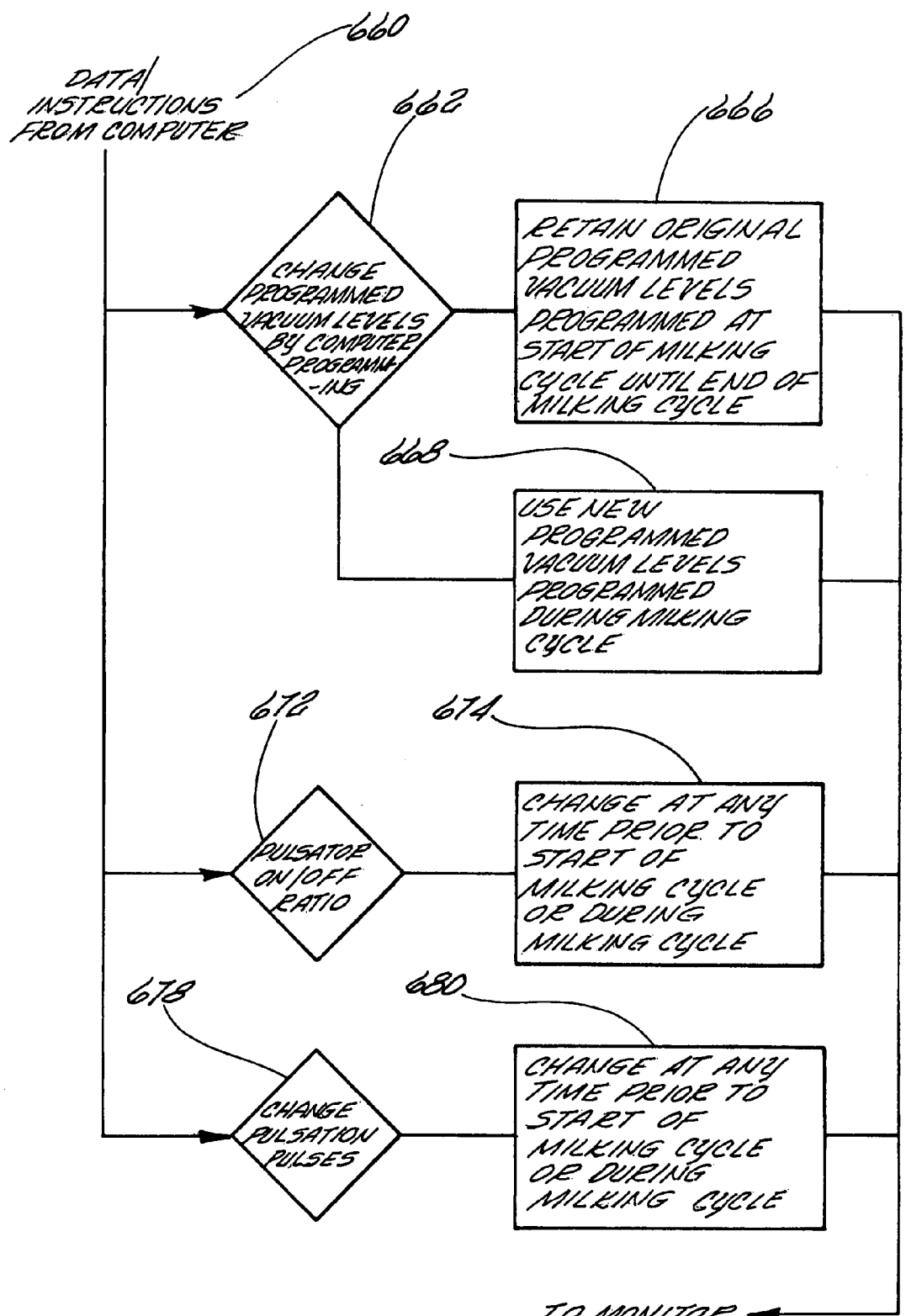
FIG. 17 is a flow diagram of software for using data/instructions from a computer to change programmed vacuum levels by computer programming, to change pulsator on/off ratios and to change pulsation pulses.

A flow diagram of software for using data instructions from a computer is shown by FIG. 17. The data/instructions are used to change programmed vacuum levels by computer programming, to change pulsator on/off ratios and to change pulsation pulses.

In FIG. 17, data/instructions from the computer shown at 660 is responded to by the software to change programmed vacuum levels as depicted by box 662. If the change programmed levels occur during a milking cycle, the software directs the system to either: (1) retain the original programming vacuum levels programmed at the start of milking cycle until end of milking cycle as depicted by the triangle 666; or (2) use a new programmed vacuum levels programmed during the milking cycle as depicted by rectangle 668.

If the programmed vacuum levels are changed prior to the start of a milking cycle, the software will retain original programmed levels throughout the milking cycle following the instructions shown by rectangle 666.

In addition, the data/instructions from the computer depicted by 660 can be used to change the pulsator on/off ratio as depicted by box 672. The pulsator on/off ratio can be changed at any time prior to start of a milking cycle or during a milking cycle as depicted by rectangle 674.

In addition, the data/instructions from the computer depicted by 660 can be used to change the pulsation pulses as depicted by box 678. The pulsation pulses can be changed at any time prior to start of a milking cycle or during a milking cycle as depicted by rectangle 680.

The changes made to the software in response to the data/instructions from the computer depicted by 660 is supplied to the controller as depicted by arrow 682. The controller is responsive to the appropriate signals from one of the rectangles 666, 668, 674 and 680 to perform the programmed changes.

All of the above teachings apply to a system for concurrently milking a number cows in individual milking stalls in a cow barn. In the preferred embodiment, the system comprises a milking system having a plurality of milking apparatus each having inflations and wherein each of the milking apparatus have a pulsator for controlling with pulsating vacuum the inflations when a milking apparatus is attached to a dairy animal, e.g. a cow, and a milking vacuum is present in the milking apparatus. The system includes a source of milking vacuum applied to each of the milking apparatus. A plurality of pulsator controllers, one of each being designated for a designated one of the plurality of milking apparatus, are used for each cow milking stall. Each of the pulsator controllers comprising a power input for receiving electrical power and a system input for receiving a start signal generated when a milking apparatus of a milking system is attached to a cow to be milked and for receiving a stop signal generated when a cow being milked has reached the end of a milking cycle or a milking apparatus is disabled. The pulsator controller also includes a first input operatively connected to a pulsator to be monitored in a milking system for receiving from the monitored pulsator a pulsating vacuum and a first sensor operatively connected to the first input for producing a first signal representing the pulsating vacuum level in the monitored pulsator. Each pulsator controller includes a processor operatively connected to the power input for receiving electrical power and to the system input for receiving a start signal or a stop signal and to the first sensor for receiving the first signal. The processor is responsive to a start signal applied to the system input for commencing monitoring of the first signal representing the pulsating vacuum level from the designated pulsator and for enabling operation of the designated pulsator to supply vacuum pulses to a milking apparatus. The processor is responsive to the stop signal to terminate monitoring of the first signal representing the pulsating vacuum level from the designated pulsator and to deactuate operation of the designated pulsator in supplying vacuum pulses to a milking apparatus in response to a stop signal applied to the input.

The pulsator controller includes a control circuit which is responsive to the at least one control signal for signaling that the monitored pulsator pulsating vacuum level is outside of the range of pulsating vacuum levels programmed as acceptable for the milking system pulsators.

In the system, the stored reference signal representing a predetermined vacuum range of pulsating vacuum levels programmed as acceptable for milking system pulsators may be: (i) derived from a pulsator; or (ii) programmed in the form of data/instructions from a computer and wherein the programmed vacuum levels can be changed by computer programming and such programmed vacuum levels are the pulsating vacuum levels acceptable for milking system pulsators.

It is envisioned that the pulsator controller in substantially the preferred embodiment or a variation thereof may have utility for other dairy animals, such as goats. It will be appreciated that various alterations and modifications may be made to the pulsator controller to enhance the functional characteristics thereof. All such variations and modifications should be considered to fall within the scope of the invention as broadly hereinbefore described and as claimed hereafter.

All such uses, variations, modifications and the like are anticipated to be within the scope of this invention.

What is claimed is:

1. A controller for monitoring and controlling an operating pulsator in a milking system, said controller comprising:
   an input for receiving a start signal generated when a milking apparatus of a milking system is attached to a cow to be milked;
   a first sensor configured to be a operatively connected to a designated pulsator for the milking apparatus attached to a cow to be milked for receiving a pulsating vacuum therefrom and for producing a first signal representing the pulsating vacuum level received from the designated pulsator;
   a processor operatively connected to said input and to said first sensor, said processor being responsive to said start signal to commencing monitoring of said first signal representing said pulsating vacuum level from the designated pulsator, said processor including a comparator for comparing said first signal to a stored reference signal representing a predetermined vacuum range of pulsating vacuum levels programmed as acceptable for milking system pulsators, said predetermined vacuum range comprising a value determined from pulsators that are independent from the milking system, said processor generating at least one control signal when the designed pulsator pulsating vacuum level is at a vacuum level outside of the predetermined vacuum range, the processor configured for monitoring only while the milking apparatus is attached to the cow to be milked; and
   a control circuit responsive to said at least one control signal for signaling that the designated pulsator pulsating vacuum level is outside of the range of pulsating vacuum levels programmed as acceptable for the milking system pulsators.

2. The controller of claim 1 wherein said input receives a stop signal generated when a cow being milked has reached the end of a milking cycle or a milking apparatus is disabled and wherein said processor is responsive to said stop signal to disable monitoring of said first signal representing said pulsating vacuum level from the designated pulsator.

3. The controller of claim 2 wherein the processor includes
   a monitoring section operatively to receive said first signal representing said pulsating vacuum level from the designated pulsator for enabling operation of the monitoring section to monitor said first signal representing said pulsating vacuum level from the designated pulsator in response to a start signal and for disabling operation of the monitoring section from monitoring said first signal representing said pulsating vacuum level from the designated pulsator in response to a stop; and
   a pulsation section operatively connect to a designated pulsator for enabling operation of the designated pulsator to supply vacuum pulses to a milking apparatus in response to a start signal and for deactuating operation of the designated pulsator in supplying vacuum pulses to a milking apparatus in response to a stop signal.

4. The controller of claim 3 wherein said processor is responsive to a start signal to concurrently to commence monitoring of said first signal representing said pulsating vacuum level from the designated pulsator and enable operation of the designated pulsator to supply vacuum pulses to a milking apparatus.

5. The controller of claim 3 wherein said processor is responsive to a stop signal to concurrently disable monitoring of said first signal representing said pulsating vacuum level from the designated pulsator and deactuate operation of the designated pulsator supplying vacuum pulses to a milking apparatus.

6. The controller of claim 1 wherein the stored reference signal representing a predetermined vacuum range of pulsating vacuum levels programmed as acceptable for milking system pulsators is derived from a pulsator.

7. The controller of claim 1 wherein the stored reference signal representing a predetermined vacuum range of pulsating vacuum levels programmed as acceptable for milking system pulsators is programmed in the farm of data/instructions from a computer and wherein said programmed vacuum levels can be changed by computer programming and such programmed vacuum levels are the pulsating vacuum levels acceptable for milking system pulsators.

8. The controller of claim 1 wherein said processor generates at least one of an acceptable control signal when the designated pulsator pulsating vacuum level is at a vacuum level within the predetermined vacuum range programmed as acceptable for the milking system pulsators and an unacceptable control signal when the designed pulsator pulsating vacuum level is at a vacuum level outside of the predetermined vacuum range programmed as acceptable for the milking system pulsators.

9. The controller of claim 8 wherein said control circuit is responsive to said acceptable control signal for signaling that the designated pulsator pulsating vacuum level is within the range of vacuum levels programmed as acceptable for the milking system pulsators.

10. The controller of claim 8 wherein said control circuit is responsive to said unacceptable control signal for signaling that the designated pulsator pulsating vacuum level is outside of the range of pulsating vacuum levels programmed as acceptable for the milking system pulsators.

11. The controller of claim 1 wherein said control circuit is responsive to said at least one control signal for sending data over a communication system to a receiving device that the designated pulsator has a pulsating vacuum level outside of the range of pulsating vacuum levels programmed as acceptable for the milking system pulsators.

12. The controller of claim 1 wherein said processor retrieves said stored reference signal representing a predetermined vacuum range of pulsating vacuum levels programmed as acceptable for milking system pulsators from a separate computer operatively connected to said processor.

13. A method for monitoring and controlling an operating pulsator in a milking system comprising the steps of:
receiving a start signal which is generated when a milking apparatus of a milking system is attached to a cow to be milked;
producing with a first sensor a first signal representing the pulsating vacuum level from the operating pulsator;
monitoring the operating pulsator only during period when the milking apparatus is attached to the cow to be milked;
comparing with a processor and commencing upon receipt of a start signal said first signal representing a pulsating vacuum level from the monitored operating pulsator to a stored reference signal representing a predetermined vacuum range of pulsating vacuum levels programmed as acceptable for milking system pulsators, the predetermined vacuum range comprising a value determined from pulsators that are independent from the milking system; and
generating with a processor at least one control signal when the monitored operating pulsator pulsating vacuum level is at a vacuum level outside of the predetermined vacuum range.

14. The method of claim 13 further comprising the step of signaling with a control circuit responsive to said at least one control signal that the monitored operating pulsator pulsating vacuum level is outside of the range of pulsating vacuum levels programmed as acceptable for the milking system pulsators.

15. The method of claim 14 further wherein the step of signaling includes signaling with a first signaling device in responsive to said at least one control signal that a monitored operating pulsator pulsating vacuum level is outside of the range of pulsating vacuum levels programmed as acceptable for the milking system pulsators.

16. The method of claim 13 wherein the step of comparing utilizes a stored reference signal representing a predetermined vacuum range of pulsating vacuum levels programmed as acceptable for milking system pulsators derived from a pulsator.

17. The method of claim 13 wherein the step of comparing utilizes a stored reference signal representing a predetermined vacuum range of pulsating vacuum levels programmed as acceptable for milking system pulsators is programmed in the form of data/instructions from a computer and wherein said programmed vacuum levels can be changed by computer programming and such programmed vacuum levels are the pulsating vacuum levels acceptable for milking system pulsators.

18. The method of claim 13 further comprising the step of receiving a stop signal generated when a cow being milked has reached the end of a milking cycle or a milking apparatus is disabled and wherein said processor is responsive to said stop signal to disable monitoring of said first signal representing said pulsating vacuum level from the designated pulsator.

19. The method of claim 13 further comprising the step of receiving a stop signal generated when a cow being milked has reached the end of a milking cycle or a milking apparatus is disabled and wherein said processor is responsive to said stop signal to concurrently deactivate the operation of the designated pulsator supplying vacuum pulses to a milking apparatus and of the monitoring section from monitoring of said first signal representing said pulsating vacuum level from the designated pulsator.

\* \* \* \* \*